(12) United States Patent
Betgar et al.

(10) Patent No.: US 11,797,936 B1
(45) Date of Patent: Oct. 24, 2023

(54) MANAGEMENT AND PRESENTATION OF SYSTEM CONTROL DATA STREAMS

(71) Applicant: Citibank, N.A., New York, NY (US)

(72) Inventors: Vitthal Ramling Betgar, New York, NY (US); Adar Danait, New York, NY (US); Balaji Kumar, New York, NY (US); Robin J. Kurian, New York, NY (US); Maneet Sharma, New York, NY (US); Anantha Veerasami, New York, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/124,870

(22) Filed: Mar. 22, 2023

(51) Int. Cl.
*G06Q 10/10* (2023.01)
*G06Q 10/06* (2023.01)
*G06Q 10/0631* (2023.01)

(52) U.S. Cl.
CPC ... *G06Q 10/103* (2013.01); *G06Q 10/063114* (2013.01)

(58) Field of Classification Search
CPC .............. G06Q 10/103; G06Q 10/063; G06Q 10/063114
USPC .................................................. 705/1.1, 301
See application file for complete search history.

(56) References Cited

U.S. PATENT DOCUMENTS

| | | | | |
|---|---|---|---|---|
| 11,093,370 | B1* | 8/2021 | Sivanantham | G06F 11/3688 |
| 2016/0055079 | A1* | 2/2016 | Hanna | G06F 11/3684 |
| | | | | 717/135 |
| 2022/0342663 | A1* | 10/2022 | Barkaee | G06F 8/77 |
| 2023/0065424 | A1* | 3/2023 | Jain | G06Q 10/06393 |
| 2023/0065530 | A1* | 3/2023 | Mohanty | G06F 11/3608 |
| 2023/0130027 | A1* | 4/2023 | Mason | G06F 11/3692 |
| | | | | 717/124 |

* cited by examiner

*Primary Examiner* — Jonathan P Ouellette
(74) *Attorney, Agent, or Firm* — Perkins Coie LLP

(57) ABSTRACT

A custom system data stream stitches together aspects of various data streams from source systems. In one implementation, an analytics circuit of a computing system extracts, from a first data stream received from a system quality assurance (QA) management system, test case data. The analytics circuit parses metadata, including a user story identifier, from the test case data. Based on the user story identifier, the analytics circuit parses, from a second data stream received from a system development lifecycle (SDLC) management computing system, SDLC item data that includes a project identifier. Based on the project identifier from the second data stream, the analytics circuit determines at least one computer application impacted by activity associated with the test case data from the first data stream. Items from the source data streams are dynamically identified for inclusion in the custom system data stream. The custom system data stream is bound to a graphical user interface. In some implementations, the interface includes a plurality of side-by-side smart dials.

20 Claims, 29 Drawing Sheets

400

Nam

@ Home / Requirement Traceability

Release: 2023.01
Last Updated: Mon, Jan 30 2023
at 11:02 AM EST

68%
Requirement Traceability

Completed Projects: 119
Total Projects: 175
Req Delivered To Testing: 99%

Global Search

Select Sub Releases ⌄
Advanced Search
My Search

- Home
- Requirement Traceability
- Project Regression
- App Regression
- ADA Execution
- Test Exit Report
- Test Plan Report
- Implementation Approval
- SS/High Defect Resolution
- Sprint Backlog
- Audit
- Readiness
- Help Export

| # | Project# | Total Req | Req Delivered To Testing | Traceability (Test Case Execution) | Linked Story Correctness | Req With 1 Test Case (Src: ALM) | Req With 1 Test Case (Src: Zephyr) | Req With 0 Test Case (Src: ALM) | Req With 0 Test Case (Src: Zephyr) | Test Tool Unknown |
|---|---|---|---|---|---|---|---|---|---|---|
| 1 | 20220900528 | 9 | 100% | 100% | 100% | CRS-129731 + CRS-127870 + | | | | |
| 2 | 20220300736 | 192 | 100% | 97% | 100% | RWDS-17561 + NCPPR-164 + | NCP-20706 + DLAB-7494 + | NCPPR-182 + | NCPPR-179 + OTR-2794 + | |
| 3 | 20220900724 | 277 | 100% | 97% | 100% | PIL-9174 + PIL-9020 + | RD-23015 + GMM-31715 + | PIL-9644 + | PIL-8992 + PIL-8896 + | |
| 4 | 20220500591 | 2 | 100% | 100% | NA | BALF-214 + BALF-208 + | | | | |
| | | | | | | BRRW-20098 + | | | | |

FIG. 4A

| # | #Epic ▼ | User Stories ▼ | User Story Status ▼ | Linked Stories ▼ | Executed cases (Zephyr) ▼ | Executed cases (ALM) Manually ▼ Verified ▼ | Applications ▼ |
|---|---|---|---|---|---|---|---|
| 1 | ACQCRU-3047 | ACQCRU-3008 | Done | ACQCRU-3007 | 0 | 12 | 152101 - Credit Utilities(l) |
| 2 | CRS-129731 | CRS-130009 | Done | | 0 | 6 | 174257 - DNA CRS Apps - ETL(l) |
| 3 | CRS-129731 | CRS-130018 | Done | | 0 | 8 | 174257 - DNA CRS Apps - ETL(l) |
| 4 | CRS-129735 | CRS-130020 | Done | | 0 | 835 | 169912 - GCB Advanced Analytics... |
| 5 | CRS-129733 | CRS-130021 | Done | | 0 | 3 | 163037 - GRMAS Citi Risk Manage... |
| 6 | CRS-129731 | CRS-130279 | Done | | 0 | 3 | 175488 - Citi Retail Services Analyt... |
| 7 | CRS-129731 | CRS-131116 | Done | | 0 | 2 | 175488 - Citi Retail Services Analyt... |
| 8 | CRS-127870 | CRS-132016 | Done | CRS-127887 | 0 | 21 | 167835 - Credit Initiation - Citi Ret... |
| 9 | CRS-129731 | CRS-132664 | Done | | 0 | 5 | 174257 - DNA CRS Apps - ETL(l) |

FIG. 4C

Release: 2023.01
20220900528
Last Updated: Mon, Jan 30 2023 at 11:02 AM EST

100%
Project Traceability — 440

Completed Stories: 9
Total Stories: 9
Linked Story Correctness: 100%
Req Delivered To Testing: 100%

[Export]

Global Search

| # | #Epic | User Stories | User Story Status | Linked Stories | Executed cases (Zephyr) | Executed cases (ALM) Manually Verified | Applications |
|---|---|---|---|---|---|---|---|
| 1 | ACQCRU-3047 | ACQCRU-3008 | Done | ACQCRU-3007 | 0 | 12 | 152101 - Credit Utilities(I) |
| 2 | CRS-129731 | CRS-130009 | Done | | 0 | 6 | 174257 - DNA CRS Apps - ETL(I) |
| 3 | CRS-129731 | CRS-130018 | Done | | 0 | 8 | 174257 - DNA CRS Apps - ETL(I) |
| 4 | CRS-129735 | CRS-130020 | Done | | 0 | 835 | 169912 - GCB Advanced Analytics... |
| 5 | CRS-129733 | CRS-130021 | Done | | 0 | 3 | 163037 - GRMAS Citi Risk Manage... |
| 6 | CRS-129731 | CRS-130279 | Done | | 0 | 3 | 175488 - Citi Retail Services Analyt... |
| 7 | CRS-129731 | CRS-131116 | Done | | 0 | 2 | 175488 - Citi Retail Services Analyt... |
| 8 | CRS-127870 | CRS-132016 | Done | CRS-127887 | 0 | 21 | 167835 - Credit Initiation -- Citi Ret... |
| 9 | CRS-129731 | CRS-132664 | Done | | 0 | 5 | 174257 - DNA CRS Apps - ETL(I) |

FIG. 4D

| | | | Release : 2023.01<br>Last Updated: Mon, Jan 30, 2023 at 11:04<br>AM EST | 80%<br>Project Regression | Completed Projects :129<br>Total Projects :162 | |
|---|---|---|---|---|---|---|

⊄ Export

| # ▾ | Project ▾ | Total CSI ▾ | Regression(%) ▾ | CSI With At least 1 Test Case ▾ | CSI With 0 Test Case ▾ |
|---|---|---|---|---|---|
| | | | | | Global Search 🔍 |
| 3 | 20220900665 | 15 | 100% | 144564 – Citibank Online (CBOL)<br>US,147316 – CBNA BI - E | 153308- Customer Management<br>Repository- US,15521 |
| 4 | 20220900724 (MV) | 40 | 93% | 144564 – Citibank Online (CBOL)<br>US,152101 – Credit Utiliti | |
| 5 | 20221000454 | 9 | 100% | 144564 – Citibank Online (CBOL)<br>US,154811 – GC Mobile | |
| 6 | 20221000458 | 9 | 100% | 144564 – Citibank Online (CBOL)<br>US,154811 – GC Mobile | |
| 7 | 20221000460 | 7 | 100% | 144564 – Citibank Online (CBOL)<br>US,154811 – GC Mobile | |
| [8] | 20221000663 | [16] | [100%] | 144564 – Citibank Online (CBOL)<br>US,154811 – GC Mobile | |
| 9 | 20220400871 | 7 | 100% | 144564 – Citibank Online (CBOL)<br>US,154811 – GC Mobile | |
| 10 | 20220300916 | 5 | 100% | 144564 – Citibank Online (CBOL)<br>US,166958 – CRS Fusion | |
| 11 | 20220900388 | 6 | 100% | 144564 – Citibank Online (CBOL)<br>US,154811 – GC Mobile | |

FIG. 5B

NAM

Home / Project Regression / 20221000663

Select Sub Releases

Advanced Search

My Search

- Home
- Requirement Traceability
- Project Regression
- App Regression
- ADA Execution
- Test Exit Report
- Test Plan Report
- Implementation Approval
- SS/High Defect Resolution
- Sprint Backlog
- Audit Readiness
- Help Release: 2023.01
20221000663
Last Updated: Mon, Jan 30 2023 at
11:05 AM EST 100%
Project Regression Completed CSI: 16
Total CSI: 16

Global Search

Export

Project Regression Test

| # | CSI # - Name | User Stories | Cases Executed | Regression % |
|---|---|---|---|---|
| 1 | 144564 - Citibank Online (CBOL) US | GMM-33477(I), GMM-32014(I), GMM-31918(I), GMM-28094(C) | 4 | 100% |
| 2 | 154811 - GC Mobile - US | RRTP-3149(I), NCP-20976(I), NCP-20883(I), NCP-20943(I), NCP-20875(I), NCP-20968(I), NCP-20964(I), NCP-20630(I), NCP-20825(I), NCP-20821(I), NCP-20939(I), NCP-21062(I), NCP-20921(I), NCP-21029(I), NCP-20917(I), GMM-32710(I), GMM-32709(I), GMM-32329(I), GMM-32326(I), GMM-32706(I), GMM-32332(I), GMM-32335, GMM-32632(I), GMM-32324(I), GMM-32321(I), GMM-32712(I) | 27 | 100% |
| 3 | 168524 - Citimobile Native Mobile App | RRTP-3140(I), GZ-9645(I), GRPW-7227(I), GMM-32885(I), GRPW-7126(I), GMM-32934(I), NCP-20912(I), NCP-20626(I), NCP-20996(I), GMM-32996(I), NCP-20634(I), NCP-20888(I), NCP-20929(I), NCP-20879(I), NCP-21060(I), NCP-20986(I), NCP-20925(I), NCP-20980(I), GMM-32422(I), GMM-32424(I), GMM-32419(I), GMM-32413(I), GMM-32726(I), GMM-32421(I), GMM-32071(C) | 24 | 100% |
| 4 | 169842 - Person2Person Payment - NA | GZ-9518(I), GZ-9444(I) | 2 | 100% |
| 5 | 169919 - Fintech Spend | GMM-33417(I), GMM-33307(I), GMM-33262(I), GMM-32741(I), GMM-32742(I), GMM-32738(I), GMM-29938(C) | 7 | 100% |
| 6 | 170184 - Citi Na Branded and Retail | DUMS-7161(I) | 1 | 100% |

FIG. 5C

| # | CSI # - Name | User Stories | Project Regression Test Cases Executed | Regression % |
|---|---|---|---|---|
| 1 | 144564 - Citibank Online (CBOL) US | GMM-33477(I), GMM-32014(I),GMM-31918(I), GMM-28094(C) | 4 | 100% |
| 2 | 154811 - GC Mobile - US | RRTP-3149(I), NCP-20976(I), NCP-20892(I), NCP-20883(I), NCP-20943(I), NCP-20875(I), NCP-20868(I), NCP-20964(I), NCP-20630(I), NCP-20825(I), NCP-20821(I), NCP-20939(I), NCP-21062(I), NCP-20921(I), NCP-21029(I), NCP-20917(I), GMM-32710(I), GMM-32709(I), GMM-32329(I), GMM-32326(I), GMM-32706(I), GMM-32332(I), GMM-32712(I), 32335, GMM-32632(I), GMM-32324(I), GMM-32321(I) | 27 | 100% |
| 3 | 168524 - Citimobile Native Mobile App | RRTP-3140(I), GZ-9645(I), GRPW-7227(I), GMM-32885(I), GRPW-7126(I), GMM-32934(I), NCP-20912(I), NCP-20626(I), NCP-20996(I), NCP-20634(I), NCP-20888(I), NCP-20929(I), NCP-20879(I), NCP-21060(I), NCP-20988(I), NCP-20925(I), NCP-20980(I), GMM-32422(I), GMM-32424(I), GMM-32419(I), GMM-32413(I), GMM-32726(I), GMM-32421(I), GMM-32071(C) | 24 | 100% |
| 4 | 169842 - Person2Person Payment - NA | GZ-9518(I), GZ-9444(I) | 2 | 100% |
| 5 | 169919 - Fintech Spend | GMM-33417(I), GMM-33307(I), GMM-33262(I), GMM-32741(I), GMM-32742(I), GMM-32738(I), GMM-29933(C) | 7 | 100% |
| 6 | 170184 - Citi Na Branded and Retail | DUMS-7161(I) | 1 | 100% |

Select Sub  
Releases  ⌄

Advanced  
Search

My Search

🏠 Home  
— Requirement  
   Traceability  
— Project  
   Regression  
— App Regression  
— ADA Execution  
— Test Exit Report  
— Test Plan Report  
— Implementation  
   Approval  
— SS/High Defect  
   Resolution  
— Sprint Backlog  
— Audit Readiness  
— Help 🏠 Home / ADA Execution Release: 2023.01  
Last Updated: Mon, Jan 30 2023  
at 11:04 AM EST ADA Execution 83%

Completed Projects: 34  
Total Projects: 41  
US Adherence: 90%

Welcome 😊 ☺ ⌕

⇐Export | Expand All | Global Search 🔍

| # ⋄ | Project ⋄ | Customer Facing Epic ⋄ | ADA Justification Required ⋄ | Platform ⋄ | ADA User Story ⋄ | US Adherence % ⋄ | ADA Executed Test Cases ⋄ | ADA Execution % ⋄ |
|---|---|---|---|---|---|---|---|---|
| 1 ⊕ | 20220800385 | | | | | 100% | | 100% |
| 2 ⊕ | 20221000209 | | | | | 100% | | 75% |
| 3 ⊕ | 20220500225 | | | | | 100% | | 100% |
| 4 ⊕ | 20220900615 | | | | | 100% | | 100% |
| 5 ⊕ | 20221100684 | | | | | 100% | | 0% |
| 6 ⊕ | 20220900546 | | | | | 100% | | 100% |
| 7 ⊕ | 20220900475 | | | | | 100% | | 100% |
| 8 ⊕ | 20220900723 | | | | | 100% | | 100% |
| 9 ⊕ | 20220401294 | | | | | 100% | | 100% |

FIG. 6A

| Release: 2023.01 Last Updated: Mon, Jan 30 2023 at 11:07 AM EST | 94% Test Exit Report | Completed Projects: 165 Total Projects: 175 |

Export    Global Search 🔍

| # | Project | Test Exit Report Status | Test Exit Owner | Approval Done | Approval Pending | Readiness % |
|---|---|---|---|---|---|---|
| 1 | 20220900528 | Completed | ABC [PBW-OT] [sm01834] | ☑ ABC [PBW-OT] [...] | XYZ [PBW-OT] [mt42...] | 100% |
| 2 | 20220300736 | Completed | ABC [PBW-OT] [sm01834] | ☑ ABC [PBW-OT] [...] | XYZ [PBW-OT] [mt42...] | 100% |
| 3 | 20220900724 | Completed | ABC [PBW-OT] [~43690] | ☑ ABC [PBW-OT] [sm01834] | XYZ [PBW-OT] [vk...] | 100% |
| | | Completed | ABCa [PBW-OT] [sm01834] | ☑ ABCa [PBW-OT] [sm01834] | XYZ [GCB-OT] [pk64...] | 100% |
| 4 | 20220500591 | Completed | ABC [PBW-OT N...] | ☑ ABC [PBW-OT N...] | XYZ [PBW-OT] [ps05530] | 100% |
| 5 | 20220800553 | | | | XYZ [PBW-OT] [m...] | 0% |

FIG. 7

| Release: 2023.01 | | Completed Projects: 165 |
|---|---|---|
| Last Updated: Mon, Jan 30 2023 at 11:09 AM EST | 91% Implementation Approval | Total Projects: 175 |

Global Search 🔍

| # | Project ⇅ | Implementation Approval Status ⇅ | Implementation Approval Owner ⇅ | Approval Done ⇅ | Approval Pending ⇅ | Readiness % ⇅ |
|---|---|---|---|---|---|---|
| 1 | 20220900528 | Artifact Approved | ABC | ☑ [PBW-OT NE] [sk3... | | 100% |
| | | Artifact Approved | ABC | ☑ [PBW-OT NE] [sk3... | | 100% |
| 2 | 20220300736 | Artifact Approved | ABC | ☑ [PBW-... | | 100% |
| 3 | 20220900724 | Artifact Approved | ABC | ☑ [PBW -OT] [pt775... | XYZ [PBW-USPB] [ka792... | 100% |
| | | Artifact Approved | ABC | ☑ [PBW -OT] [pt775... | XYZ [PBW-USPB] [ka792... | 100% |
| 4 | 20220500591 | Artifact Approved | ABC | ☑ [PBW-OT NE] [pd438... | | 100% |

| | A | B | C | D | E | F | G | H | I | J | K | L | M | N | O | P | Q |
|---|---|---|---|---|---|---|---|---|---|---|---|---|---|---|---|---|---|
| 1 | | | | | | | | | | | | | | | | | |
| 2 | | Release | 2023.01 | | | | | | | | | | | | | | |
| 3 | | Project Number | 20221000592 | | | | | | | | | | | | | | |
| 4 | | Review Areas | | | | | | | | | | | | | | | |
| 5 | | Links(Please click to go to individual sheet) | Completion % | | | | | | | | | | | | | | |
| 6 | | Traceability | 94% | | | | | | | | | | | | | | |
| 7 | | Project Regression | 100% | | | | | | | | | | | | | | |
| 8 | | ADA | 67% | | | | | | | | | | | | | | |
| 9 | | Test Plan | 100% | | | | | | | | | | | | | | |
| 10 | | Test Exit Report | 100% | | | | | | | | | | | | | | |
| 11 | | Sprint Backlog | 100% | | | | | | | | | | | | | | |
| 12 | | SS-High Defect Resolution | 100% | | | | | | | | | | | | | | |
| 13 | | Implementation Approval | 0% | | | | | | | | | | | | | | |

Summary | Traceability | Project Regression | ADA | Test Plan | Test Exit Report | Sprint Backlog | SS-High Defect Resolution | Implementation Approval

FIG. 12B

FIG. 14 under development. Issue
MANAGEMENT AND PRESENTATION OF SYSTEM CONTROL DATA STREAMS

BACKGROUND

In systems development, test case management systems allow users to create and manage system test cases to improve the quality of systems under development. Issue and project tracking systems allow users to monitor progress of various system development tasks. After systems and/or their respective feature sets are tested and deployed in release or production environments, asset management systems allow users to manage system versions, patches, enhancements, and the like. Development and implementation of system versions, patches, enhancements, and the like can necessitate additional use of test case management systems and/or issue and project tracking systems. These types of systems do not conventionally enable a holistic view into the system development process and its impact on system environments and applications.

BRIEF DESCRIPTION OF THE DRAWINGS

FIGS. 4A and 4B are GUI diagrams illustrating example requirements traceability analytics by project of the disclosed system in some implementations of the present technology.

FIGS. 4C and 4D are GUI diagrams illustrating example requirements traceability analytics by release of the disclosed system in some implementations of the present technology.

FIGS. 5A-5D are GUI diagrams illustrating example project regression analytics of the disclosed system in some implementations of the present technology.

FIGS. 6A-6C are GUI diagrams illustrating example accessibility analytics of the disclosed system in some implementations of the present technology.

FIG. 7 is a GUI diagram illustrating example test exit analytics of the disclosed system in some implementations of the present technology.

FIG. 9 is a GUI diagram illustrating example approval analytics of the disclosed system in some implementations of the present technology.

FIGS. 12A and 12B are GUI diagrams illustrating example system audit readiness analytics of the disclosed system in some implementations of the present technology.

FIG. 14 is a GUI diagram illustrating example contextual help capabilities of the disclosed system in some implementations of the present technology.

Figure 1:
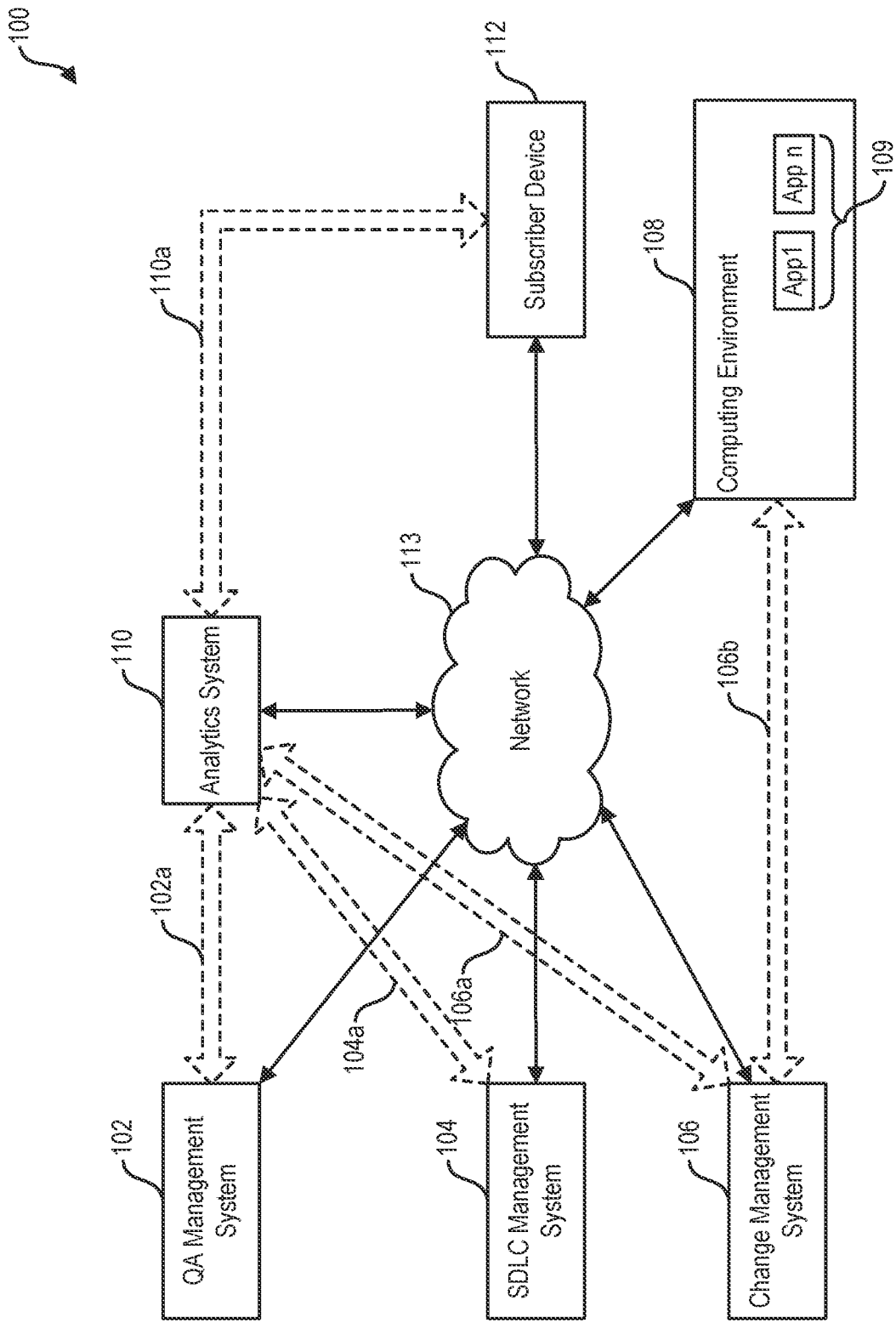
FIG. 1 is a system diagram showing some of the components typically incorporated in at least some of the computer systems and other devices on which the disclosed system operates in accordance with some implementations of the present technology.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Test case management systems, issue and project tracking systems, and/or change management systems are typically separate systems that may lack interoperability. Testers may use test case management systems to ensure that systems conform to requirements. Project managers and developers may use issue and project tracking systems to ensure that projects are delivered on time. System administrators may use change management systems to keep track of technology assets within an organization. However, conventionally, these systems, considered individually, do not enable a holistic view into the system development process and its impact on system environments and applications.

Accordingly, disclosed herein are systems, methods, and computer-readable media for management and presentation of system control data streams, including systems, methods, and computer-readable media for generating a custom system data stream that stitches together aspects of various data streams from source systems, such as the systems described above. System control items can include, for example, requirement traceability, project regression, system accessibility compliance, test plan readiness, test exit completion, implementation approval, defect resolution, and/or sprint backlog statistics. In one implementation, an analytics circuit of a computing system extracts, from a first data stream received from a system quality assurance (QA) management system, test case data. The analytics circuit parses metadata, including a user story identifier, from the test case data.

Based on the user story identifier, the analytics circuit parses, from a second data stream received from a system development lifecycle (SDLC) management computing system, SDLC item data that includes a project identifier. Based on the project identifier from the second data stream, the analytics circuit determines at least one computer application impacted by activity associated with the test case data from the first data stream. Items from the source data streams are dynamically identified for inclusion in the custom system data stream. The custom system data stream is bound to a graphical user interface. In some implementations, the interface includes a plurality of side-by-side smart dials.

The systems and methods disclosed herein provide technical advantages over conventional systems. For example, conventionally, data regarding various system control items, such as requirement traceability, project regression, system accessibility compliance, test plan readiness, test exit completion, implementation approval, defect resolution, and/or sprint backlog, is distributed across computing systems, which makes it practically very challenging for a reviewer to access this data and related analytics via a single interface and increases the possibility of introducing errors, as the control items are conventionally calculated manually and without using standardized formulae, which makes them prone to error. Furthermore, because of the lack of standardization, control items can be erroneous based on incorrect input data. The systems and methods disclosed herein solve the technical problem associated with limited display areas and a lack of interoperability among the various systems by using data from different systems to generate a system data stream that can be bound to a limited set of controls for single-interface presentation of data on one screen.

As another example, conventionally, data regarding requirement traceability, project regression, system accessibility compliance, test plan readiness, test exit completion, implementation approval, defect resolution, and/or sprint backlog, and/or the like is not linked to affected units (e.g., applications) in a production environment. Accordingly, this presents a technical problem of not being able to determine and/or predict the impact of changes in production environments, particularly when such changes have cascading effects. For example, any of a new requirement added to the existing product feature, a new functionality or feature added to the product, optimized codebase to improve performance, addition of patch fixes, and/or configuration changes can affect target as well as upstream and/or downstream units. The systems and methods disclosed herein solve the technical problem associated with unit lifecycle management by generating a system control data stream that relates various system development lifecycle items to the affected units.

As another example, conventionally, segmented data regarding requirement traceability, project regression, system accessibility compliance, test plan readiness, test exit completion, implementation approval, defect resolution, and/or sprint backlog, and/or the like is not natively suitable for machine learning models to identify candidate predictive features, which reduces predictive accuracy of machine learning models applied to the segmented data. The systems and methods disclosed herein solve this technical problem by generating a system control data stream that pre-processes and optimizes various system control data items to make them suitable as inputs to machine learning models. Such models can be used in a variety of ways to generate predictions regarding system development lifecycles and affected units, to generate optimizations of system development lifecycles and affected units, and/or the like.

Overview

For brevity, the terms "user" and "subscriber" are used interchangeably, although one of skill will appreciate that certain features of the disclosed systems and techniques can be accessible to individuals or entities that are not registered with service providers. The term "release" refers to distribution, deployment, or other action to make available a system or feature set. A particular release can include one or more units of work ("projects") and/or a particular unit of work ("project") can be associated with one or more releases. Units of work can be performed according to requirements, which can be associated with performance metrics, such as requirements traceability (the ability to follow a requirement from a first particular point to another particular point). Groups of units of work within a project and/or a release can be implemented as a group, as a feature set, in a sprint, etc. Groups of requirements within a project and/or a release can be organized into epics, stories, etc.

Example Analytics System(s)

FIG. 1 is a system diagram showing some of the components typically incorporated in at least some of the computer systems and other devices on which the disclosed system operates in accordance with some implementations of the present technology. To solve the technical problems described herein, the inventors have conceived and reduced to practice a computing system structured to facilitate management and presentation of system control data streams from various source systems. According to various embodiments, the system described herein includes machine learning models and/or other techniques to enable requirements traceability analytics, project regression analytics, system accessibility analytics, test exit analytics, test plan analytics, approval analytics, defect analytics, sprint backlog analytics, and/or audit readiness analytics for various computing systems within an organization.

As shown, the environment 100 includes a QA management system 102, an SDLC management system 104, a change management system 106, a computing environment 108, an analytics system 110, and a subscriber device 112. As shown, the components are communicatively coupled via network 113. The QA management system 102 can be structured to manage data about requirements, test cases, approvals, accessibility features, and related system features (e.g., in relation to development items for applications 109). The SDLC management system 104 can be structured to manage data about project planning, deliverables, and/or resources and related system features (e.g., in relation to development items for applications 109). The change management system 106 can be structured to manage data about technology assets (e.g., applications 109, executables, code versions, deployment instances, and the like) and related system features. The computing environment 108 can be an internal or external computing environment that can include various applications 109. The analytics system 110 can be structured to perform the operations described herein, such as, for example, the operations described in relation to FIG. 2. Various user interfaces generated by the analytics system 110 can be presented to subscribers using one or more of subscriber devices 112.

In operation, the analytics system 110 can receive data streams from any of the QA management system 102, SDLC management system 104, change management system 106, computing environment 108, and/or subscriber device 112. For example, QA management system 102 can provide a data stream 102a, which can include test case data, such as user story data, epic data, requirement data, approver data, completion data and/or the like. For example, SDLC management system 104 can provide a data stream 104*a*, which can include project planning data, timeline data, deliverable data, resource data (e.g., people, assets), and/or the like. For example, the change management system 106 can provide a data stream 106*a*, which can include asset data, application data, executable data, deployment instance data, and/or the like. For example, computing environment 108 can provide data regarding operational state of various applications 109, which it can exchange with the change management system 106. For example, subscriber device 112 can be an administrator device used to provide various configuration settings for the analytics system 110. Various additional systems can be interfaced with the analytics system 110 to provide additional data, such as, for example, active directory data including user names, email addresses, titles, and/or the like.

The data streams can be received by the analytics system 110 in real-time or scheduled mode through a suitable channel, including application programming interface (API) calls, RSS feeds, REST interfaces, batch file uploads, SQL queries, and/or the like. The data items can be structured according to various formats, such as RSS, CSV, HTML, XML, Excel, SQL query data sets, and/or the like.

Based on the received data, the analytics system 110 can be structured to generate one or more system data streams 110*a*, which can consolidate, optimize, aggregate, de-aggregate, transform, tag and/or otherwise process various data items in the received data streams. For example, in some implementations, the test data 102*a* and SDLC data 104*a* can be linked in the system data stream based on a suitable cross-referencing identifier, such as a story identifier, epic identifier, project identifier, and/or the like. As another example, the test data 102*a* can be linked, via the SDLC data 104*a*, to application data 106*a*, by first cross-referencing the test data 102*a* with the SDLC data 104*a* and then cross-referencing the SDLC data 104*a* with application data 106*a*. In some implementations, the analytics system 110 can parse out the inbound data streams according to one or more criteria, such as application area, task type, requirement type, functional unit, application, server, network segment (subnet the where the affected application(s) 109 are deployed), and/or the like such that only the specified relevant data is included in the outbound data stream 110*a*. To that end, one or more parser executables can be deployed at various points, including before the inbound data streams reach the analytics system 110, at the analytics system 110, and/or after the inbound data streams are generated and bound to user interfaces to be displayed (e.g., via client-side parsers at the subscriber devices 112). In some implementations, the outbound data stream 110*a* can include any of markup language tags, flat files, relational data, interface messages, key-value pairs and/or the like. In some implementations, data from the outbound data stream 110*a* is stored in a database.

Method(s) of Operation of the Example Analytics System(s)

Figure 2:
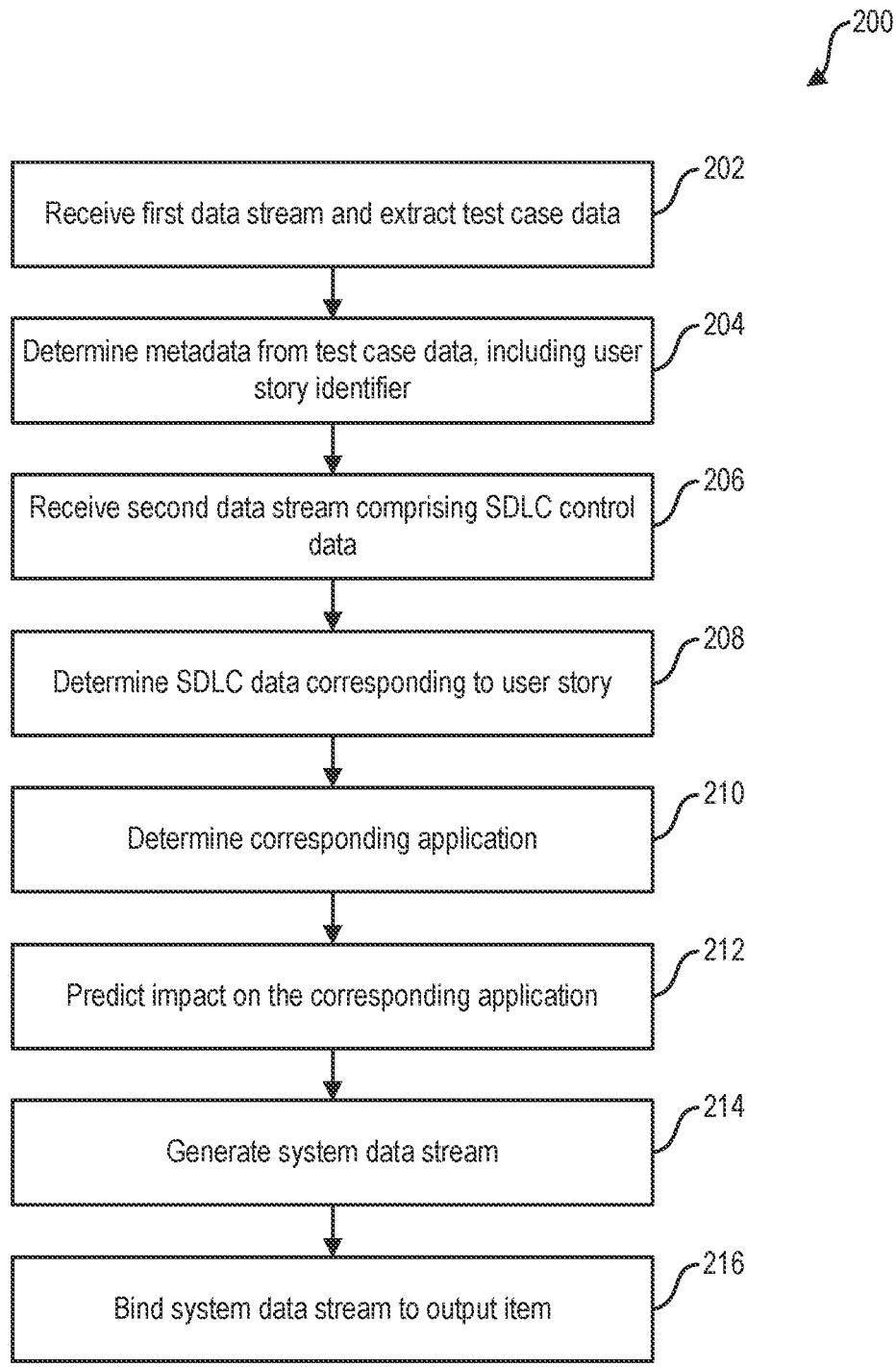
FIG. 2 is a flow diagram illustrating an example process for management and presentation of system control data streams that can be performed by the disclosed system in some implementations of the present technology.

FIG. 2 is a flow diagram illustrating an example process 200 for management and presentation of system control data streams that can be performed by the disclosed system in some implementations of the present technology. For example, some or all operations of process 200 can be performed and/or controlled by the analytics system 110, either alone or in combination with other system(s). As a general overview, process 200 can include receiving inbound data streams, extracting test, SDLC control, and/or application data from the received inbound data streams, generating determinations regarding the affected applications or other items in a computing environments, generating predictions regarding impact of activities codified in the test and/or SDLC control data on the computing environments, based on the generated predictions, generating a system data stream that includes various indicia, and binding the system data stream to a limited set of displayable smart dials indicative of system state and/or generated predictions.

In operation, at 202, the analytics system 110 receives an inbound data stream from a QA system or similar system or systems and extracts test case data from the inbound data stream. At 204, the analytics system 110 generates a determination of one or more metadata items, based on test case data, to include in the system data stream. For example, a metadata item can include a story identifier, an epic identifier, a project identifier, a release identifier, an application identifier, or another identifier that, in whole or in part, can be cross-referenced to or otherwise used to determine relevant project data and application data. For example, a metadata can include a tag or another markup-language based item that includes the identifier or an item or items that can be used to determine an identifier. In some implementations, the metadata items can be fed to a machine learning model trained to determine (e.g., based on data labels, data types, data content, etc.) identifier candidates and/or corresponding likelihood scores for which data can be linked to data in other source data streams.

At 206, the analytics system 110 receives an inbound data stream from an SDLC control system or similar system or systems and extracts SDLC control data. At 208, the analytics system 110 generates a determination of one or more metadata items, based on SDLC control data, to include in the system data stream. For example, a metadata item can include a story identifier, an epic identifier, a project identifier, a release identifier, an application identifier, or another identifier that, in whole or in part, can be cross-referenced to or otherwise used to determine relevant test case data and application data. For example, a metadata can include a tag or another markup-language based item that includes the identifier or an item or items that can be used to determine an identifier. In some implementations, the metadata items can be fed to a machine learning model trained to determine (e.g., based on data labels, data types, data content, etc.) identifier candidates and/or corresponding likelihood scores for which data can be linked to data in other source data streams.

At 210, the analytics system 110 determines one or more applications that correspond to the cross-referenced data from the test case and SDLC control data streams. For example, the analytics system 110 can cross-reference a change management data set/stream to determine applications that will be affected by particular projects. In some implementations, directly affected applications can be determined first (based on, for example, a cross-referenced item from the SDLC control data stream).

Downstream (connected, impacted, and/or supported) applications can be determined next, at 212, using, for example, a machine learning model such as a neural network that determines application and system component relationships to identify downstream systems relative to the directly affected application. The system can generate various other predictions related to estimated impact on the applications, such as predicted downtime window, predicted downtime duration, predicted throughput/processing capacity (e.g., for interfaces), predicted CPU usage, predicted memory usage, predicted requests per minute, predicted bytes per request, predicted latency, predicted upload speed, predicted download speed, average response time, user satisfaction score, and/or the like. To generate the predictions, the system can use historical data regarding similar or related metrics along with the cross-referenced data from the test case and SDLC data streams.

At 214, the analytics system 110 can generate a system data stream that includes the cross-referenced value, supplemental information, predicted information, and/or the like. In some implementations, a single system data stream includes data for the entire computing environment. In some implementations, multiple system data streams are dynamically constructed according to data stream configuration parameters. The data stream configuration parameters can, for example, specify smart dial display options (e.g., determining which smart dials/indicia to display), the type of data attributes to include in a particular generated system data stream (e.g., add or remove certain tags, such as owner/approver contact information, affected applications, system accessibility schemas, requirements type, defect severity), and so forth.

At 216, the analytics system 110 can bind the generated data stream to a set of output items. Output items can include alerts (e.g., based on templates associated with the generated data streams), notifications, destination paths to output data files that include items in the data stream, user interface controls and/or the like. For example, the analytics system 110 can determine (e.g., based on change management data) approver information and email addresses and generate notifications using this information. For example, the analytics system 110 can use the generated data stream to populate and/or configure user interface controls, such as smart dials. For example, the analytics system 110 can provide the generated data stream as an input to machine learning models or other predictive models for further analytics. Further analytics can include system impact analytics, system downtime analytics, developer efficiency analytics, query engines that underlie natural language processors (e.g., chat bots structured to operate on test case, SDLC control, and/or application data), and/or the like.

Feature(s) of the Example Analytics System(s)

According to various embodiments, the GUIs described herein enable requirements traceability analytics, project regression analytics, system accessibility analytics, test exit analytics, test plan analytics, approval analytics, defect analytics, sprint backlog analytics, and/or audit readiness analytics for various computing systems within an organization. The GUIs can be implemented as one or more circuits, controls, binaries, graphics and/or other components that comprise a user interface, and can include programmable visual components (e.g., dials, sliders, grids, parsing controls, labels, checkboxes, option buttons and/or the like). In order to overcome the technical problems associated with small computer screens, the visual components can be bound to custom data streams. The custom data streams can be generated by the analytics system 110 based on data from several source systems. This architecture enables presentation of system data and insights via a limited number of configurable controls visible in a small number (e.g., one, two) of groups or screens at a time.

As a general overview, the GUIs can include resizable panels that can show various global items applicable to more than one individual view. Global items can include generated values determined using system data streams bound to individual controls shown on the GUIs. Global items can include, for example, a menu area (e.g., 310, 410, 450 and so forth), which can be populated with dynamically generated menu options relevant to the displayed individual controls. Global items can include, for example, header area (e.g., 303, 323, 403, 423, 443 and so forth), which can be populated dynamically (e.g., with values determined or calculated at run-time as the particular GUI is initialized, loaded, and/or refreshed) based on metadata generated for the system data streams, such as data timestamp, release information, number of completed projects according to a particular control variable, number of total projects, etc.

Figure 3A:
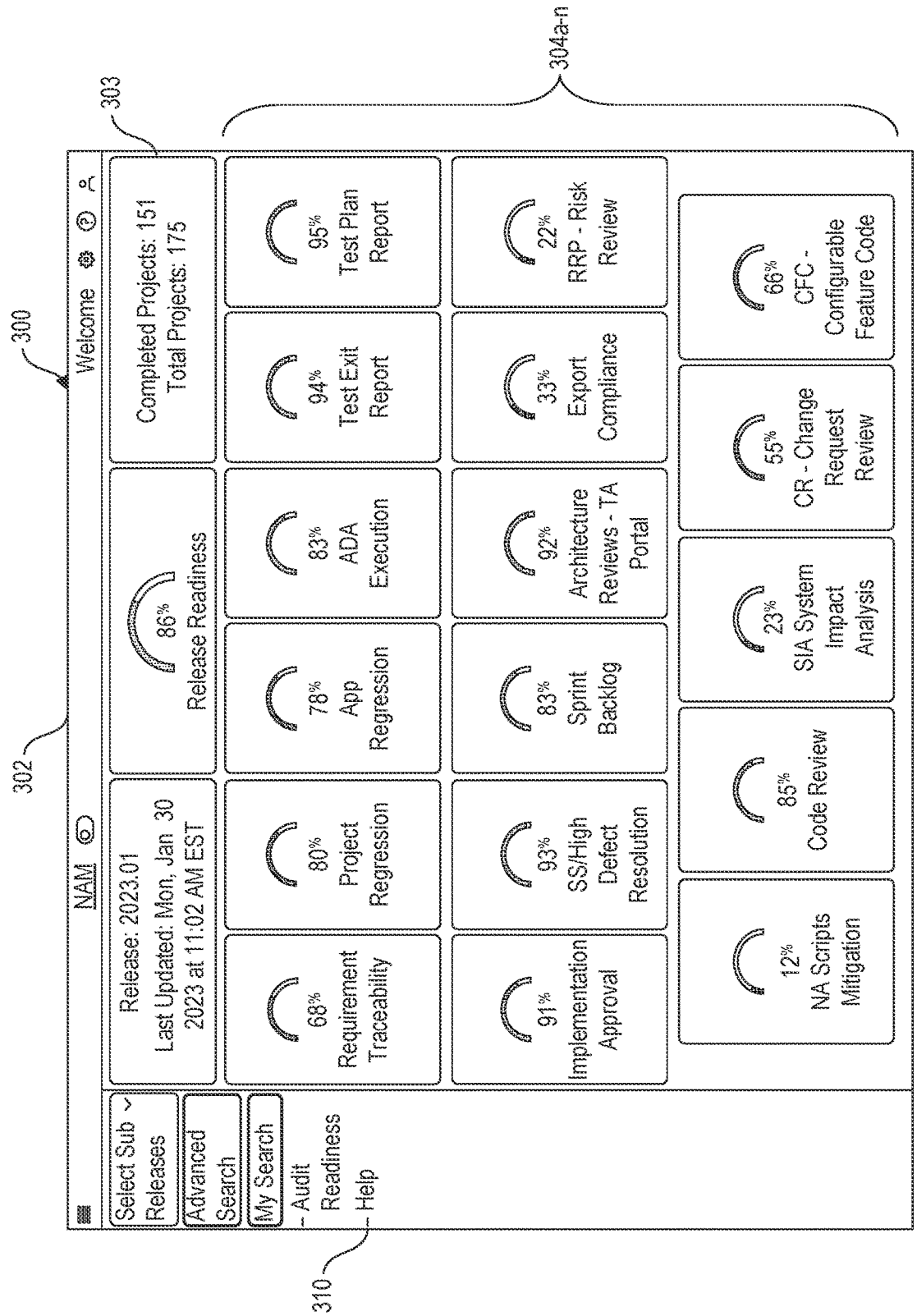
FIGS. 3A and 3B are graphical user interface (GUI) diagrams illustrating example landing screens of the disclosed system in some implementations of the present technology.
Figure 3B:
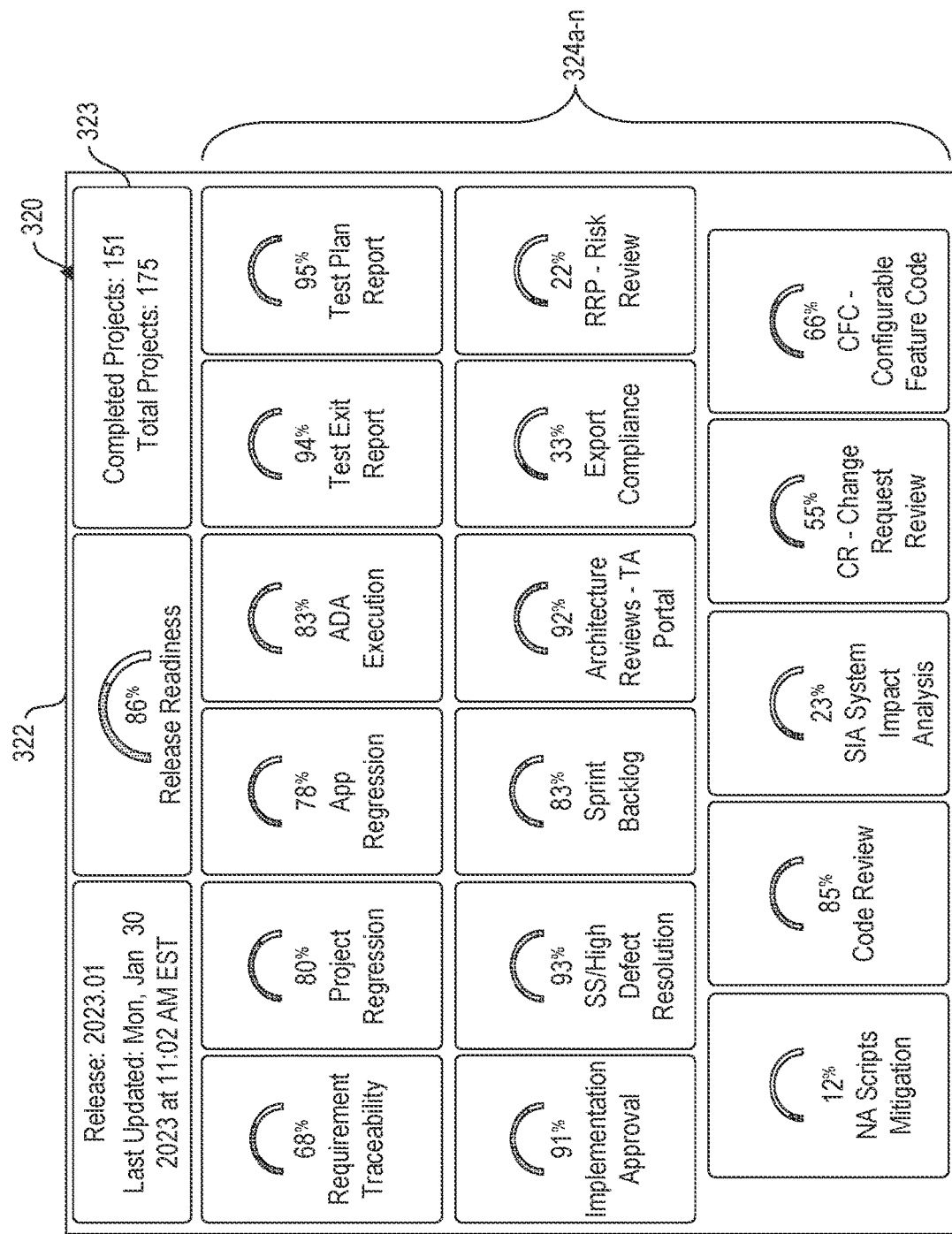

FIGS. 3A and 3B are graphical user interface (GUI) diagrams illustrating example landing screens (300, 320) of the disclosed system in some implementations of the present technology. In some implementations, the landing screens (300, 320) are summary screens. The summary screens can be populated with configurable summary controls (304a-n, 342a-n) that illustrate individual system management and/or performance parameters determined based on the generated system data stream(s). These controls can include, for example, calculated and/or dynamically determined values relating to requirements traceability, project regression, system accessibility, test exit statistics, test plan statistics, implementation approval statistics, defect resolution, sprint backlog, and so forth. According to various implementations, the controls can include graphical and/or text elements and can show progress and/or completion status in absolute or relative numerical terms (e.g., a count, a percentage of total).

In some implementations, the controls can be implemented as one or more smart dials. The smart dials can include one or more graphical elements. The graphical elements can be parametrized and programmatically configurable based on system data stream data, system data stream metadata, and/or dynamically determined/calculated values using the system data stream data and/or supplemental data related to one or more items in the system data stream. For example, a particular smart dial can include a graphical element (e.g., an arc, a progress bar, a circle, and/or the like) whose color, fill, opacity, and/or another suitable property affecting the display of the element is set dynamically based on the above parameters.

In some implementations, detecting a user interaction with a particular smart dial causes the system to display a corresponding user interface that provides further information from the system data stream. In some implementations, detecting a user interaction with an item in further information causes the system to display a corresponding user interface that provides a log-in page to the corresponding source system (based, e.g., on a tag in the system data stream that identifies the source system(s) for a particular data item).

Figure 4B:
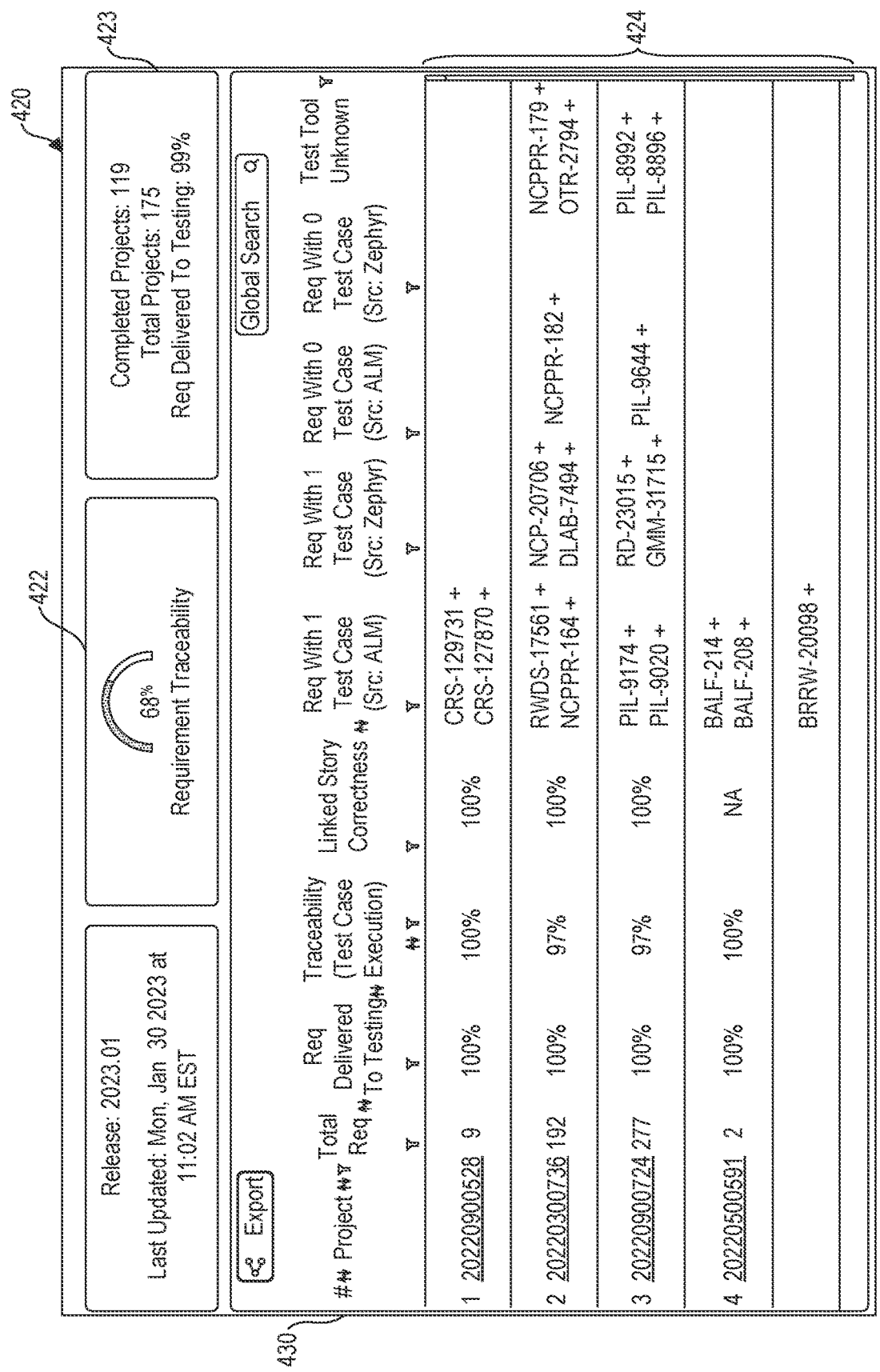
Figure 5A:
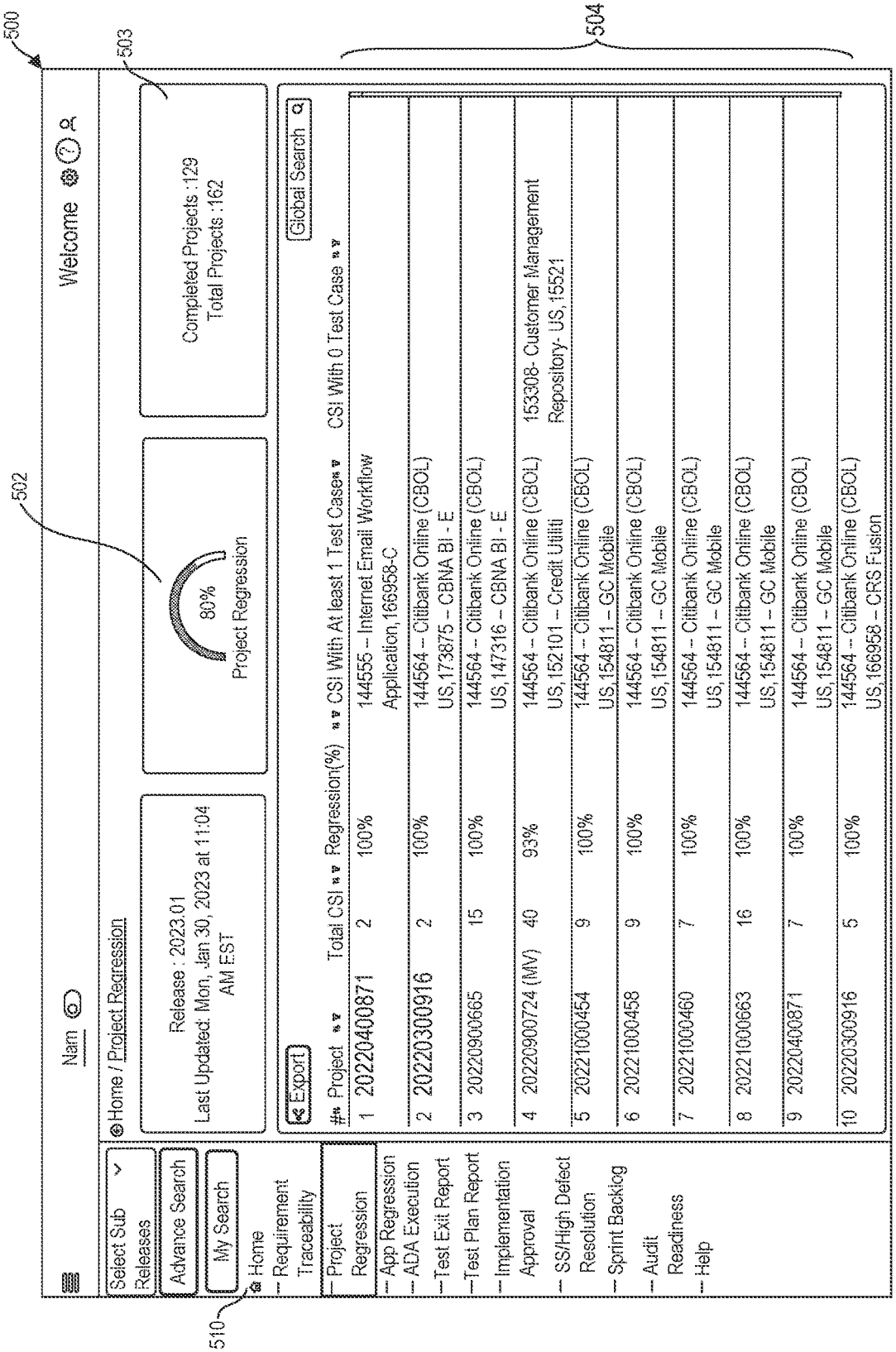

FIGS. 4A and 4B are GUI diagrams (400, 420) illustrating example requirements traceability analytics (404, 424) by project of the disclosed system in some implementations of the present technology, and FIGS. 4C and 4D are GUI diagrams (440) illustrating example requirements traceability analytics (444, 464) by release of the disclosed system in some implementations of the present technology. As a general overview, the GUI diagrams (400, 420) illustrate implementations where the project-, test-, and application-level items from the generated system data stream are used to determine the state of test case execution relative to system requirements.

As shown, various items included in requirements traceability analytics (404, 424) from the generated system data stream can be programmatically bound to a presentation control (e.g., grid, table, text area, graphic, or another suitable control). In some implementations, these items can include data items organized by project. For example, project data can be programmatically associated with test case data to derive, by project, a total number of requirements, requirements delivered to testing, traceability percentages, linked story correctness percentages, test case to requirement mapping, and so forth. In some implementations, these items can include data items organized by release. In some implementations, project data can be prioritized or otherwise sequenced, altered, or enhanced by applying to the project data a set of parsing criteria and/or supplemental project information, such as priority information, received from a project tracking system. For example, release data can be programmatically associated with test case data to derive, by release, epic statistics, user story statistics, affected applications, and so forth.

According to various implementations, to optimize system performance, requirements traceability analytics (404, 424) can be built into (e.g., at the computational logic layer) the set of operations that generates the system data stream and/or can be performed after the system data stream is generated and before various elements of the system data stream are bound to the GUI controls. For example, when the system data stream is generated, test data and project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of items that represent completed executed test cases may change dynamically, the executed case counts can be determined dynamically as the GUI is provided to the subscriber.

FIGS. 5A-5D are GUI diagrams (500, 520, 540, 560) illustrating example project regression analytics (504, 524, 544, 564) of the disclosed system in some implementations of the present technology. As a general overview, the GUI diagrams (500, 520, 540, 560) illustrate implementations where the project-, test-, and application-level items from the generated system data stream are used to determine and/or predict the impact of project items (e.g., a release of a feature) on connected applications. For example, determining and/or predicting the impact can include determining and/or generating a prediction regarding whether a particular connected application works as intended after the project item is released.

As shown, various items included in project regression analytics (504, 524, 544, 564) from the generated system data stream can be programmatically bound to a presentation control (e.g., grid, table, text area, graphic, or another suitable control). In some implementations, these items can include data items organized by project. For example, project data can be programmatically associated with test case data to derive, by project, a number of affected applications, a regression percentage (e.g., based on the number of tested features relative to impacted applications), applications with at least one test case, and so forth. In some implementations, these items can include data items organized by application. For example, as shown in 544, user stories and their associated project regression test case completion status can be presented by application. In some implementations, project data can be prioritized or otherwise sequenced, altered, or enhanced by applying to the project data a set of parsing criteria and/or supplemental project information, such as priority information, received from a project tracking system. For example, release data can be programmatically associated with test case data to derive, by release, epic statistics, user story statistics, affected applications, and so forth.

According to various implementations, to optimize system performance, project regression analytics (504, 524, 544, 564) can be built into (e.g., at the computational logic layer) the set of operations that generates the system data stream and/or can be performed after the system data stream is generated and before various elements of the system data stream are bound to the GUI controls. For example, when the system data stream is generated, test data and project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of items that represent completed project regression test cases may change dynamically, the executed case counts can be determined dynamically as the GUI is provided to the subscriber.

Figure 6B:
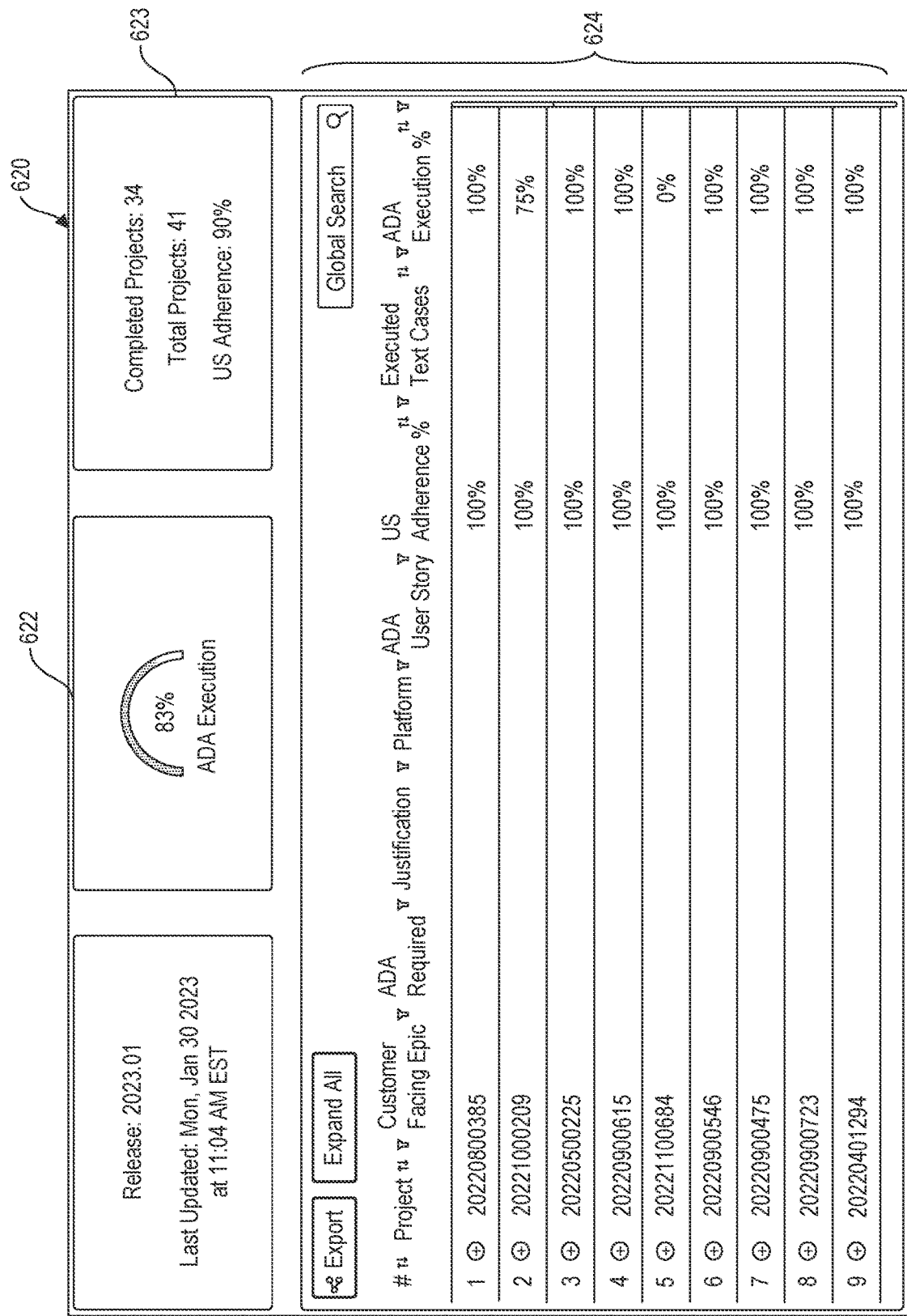
Figure 6C:
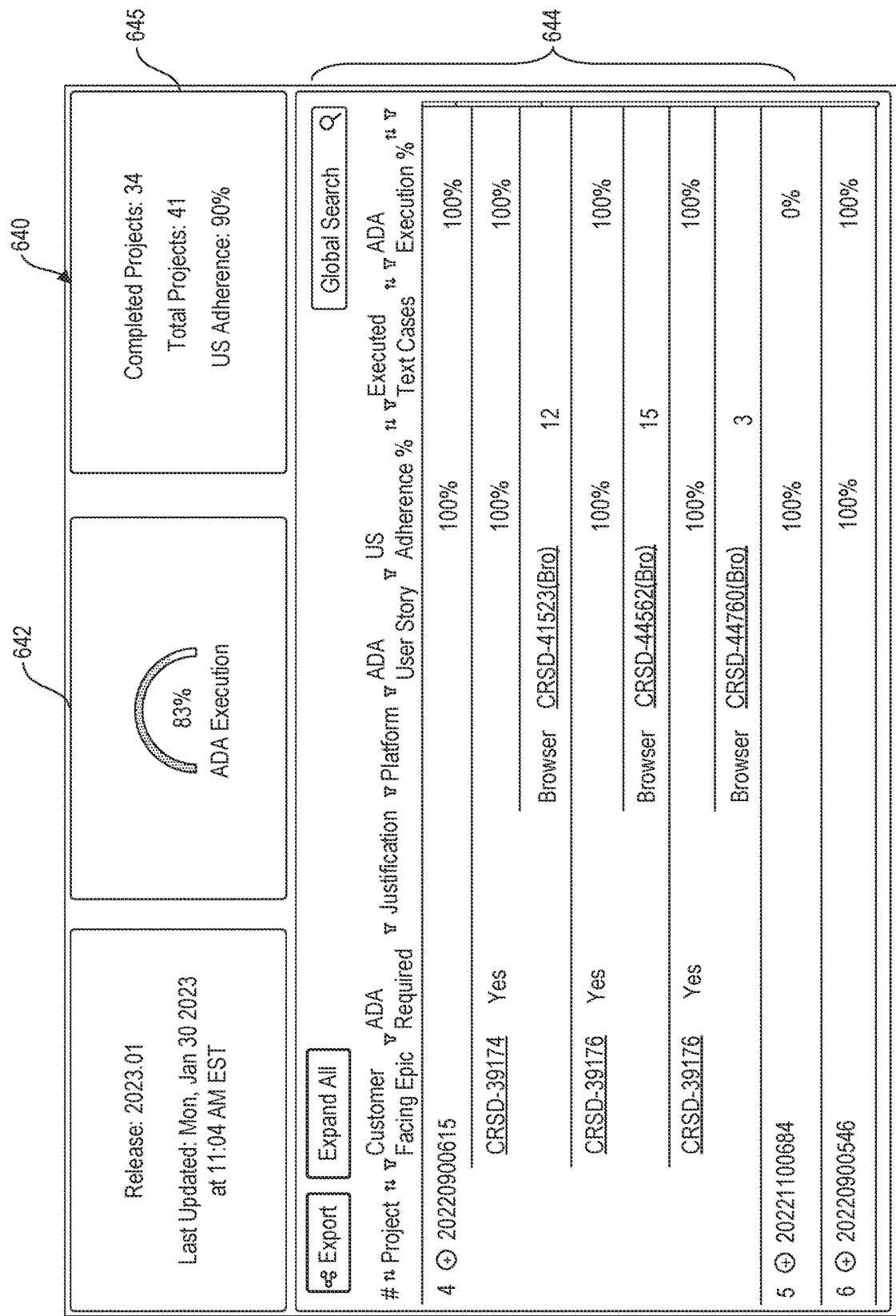

FIGS. 6A-6C are GUI diagrams illustrating example system accessibility analytics of the disclosed system in some implementations of the present technology. As a general overview, the GUI diagrams (600, 620, 640) illustrate implementations where the project-, test-, and application-level items from the generated system data stream are used to determine and/or predict the extent to which project items (e.g., a release of a feature) and/or connected applications are compliant with system accessibility guidelines. For example, determining and/or predicting compliance with system accessibility guidelines can include determining and/or generating a prediction regarding whether a particular connected application or feature is accessible to individuals with disabilities, for example, whether images include captions, whether text items can be read out loud, whether various data input methods are supported, etc.

As shown, various items included in system accessibility analytics (604, 624, 644) from the generated system data stream can be programmatically bound to a presentation control (e.g., grid, table, text area, graphic, or another suitable control). In some implementations, these items can include data items organized by project. For example, project data can be programmatically associated with test case data to derive, by project, a percentage of executed system accessibility test cases and/or a percentage of features in compliance. In some implementations, these items can include data items organized by a customer-facing epic, an application, and/or an application feature. For example, as shown in 644, epics and their associated accessibility test case completion status can be presented by platform (browser, GUI), input device (keyboard, microphone), output device (monitor, speaker), and/or the like. In some implementations, project data can be prioritized or otherwise sequenced, altered, or enhanced by applying to the project data a set of parsing criteria and/or supplemental project information, such as priority information, compliance requirement set information (U.S. requirements, international requirements, etc.) received from a project tracking system.

According to various implementations, to optimize system performance, system accessibility analytics (604, 624, 644) can be built into (e.g., at the computational logic layer) the set of operations that generates the system data stream and/or can be performed after the system data stream is generated and before various elements of the system data stream are bound to the GUI controls. For example, when the system data stream is generated, test data, compliance requirement set(s) and project data can be tagged and/or linked based on a determined common identifier, such as a project identifier and/or a user story identifier. For example, when the system data stream is generated, in order to increase the speed of data retrieval when the GUI is displayed, affected applications and/or platforms can be determined and the data stream can be tagged with the corresponding affected application information. For example, because the number of items that represent completed system accessibility test cases may change dynamically, the executed case counts can be determined dynamically as the GUI is provided to the subscriber.

FIG. 7 is a GUI diagram illustrating example test exit analytics of the disclosed system in some implementations of the present technology. As a general overview, the GUI diagram (700) illustrates implementations where the project-, test-, and application-level items from the generated system data stream are used to determine and/or predict test exit information. For example, determining and/or predicting the test exit information can include determining and/or generating a prediction regarding an extent (e.g., percentage) to which a particular feature has been tested.

As shown, various items included in test exit analytics (704) from the generated system data stream can be programmatically bound to a presentation control (e.g., grid, table, text area, graphic, or another suitable control). In some implementations, these items can include data items organized by project. For example, project data can be programmatically associated with test case data to derive, by project, a test exit status, approver(s), approval status, and/or a readiness percentage. In some implementations, project data can be prioritized or otherwise sequenced, altered, or enhanced by applying to the project data a set of parsing criteria and/or supplemental project information, such as priority information, received from a project tracking system.

According to various implementations, to optimize system performance, test exit analytics (704) can be built into (e.g., at the computational logic layer) the set of operations that generates the system data stream and/or can be performed after the system data stream is generated and before various elements of the system data stream are bound to the GUI controls. For example, when the system data stream is generated, test data and project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of completed and/or approved test exit items may change dynamically, the test exit counts can be determined dynamically as the GUI is provided to the subscriber.

Figure 8:
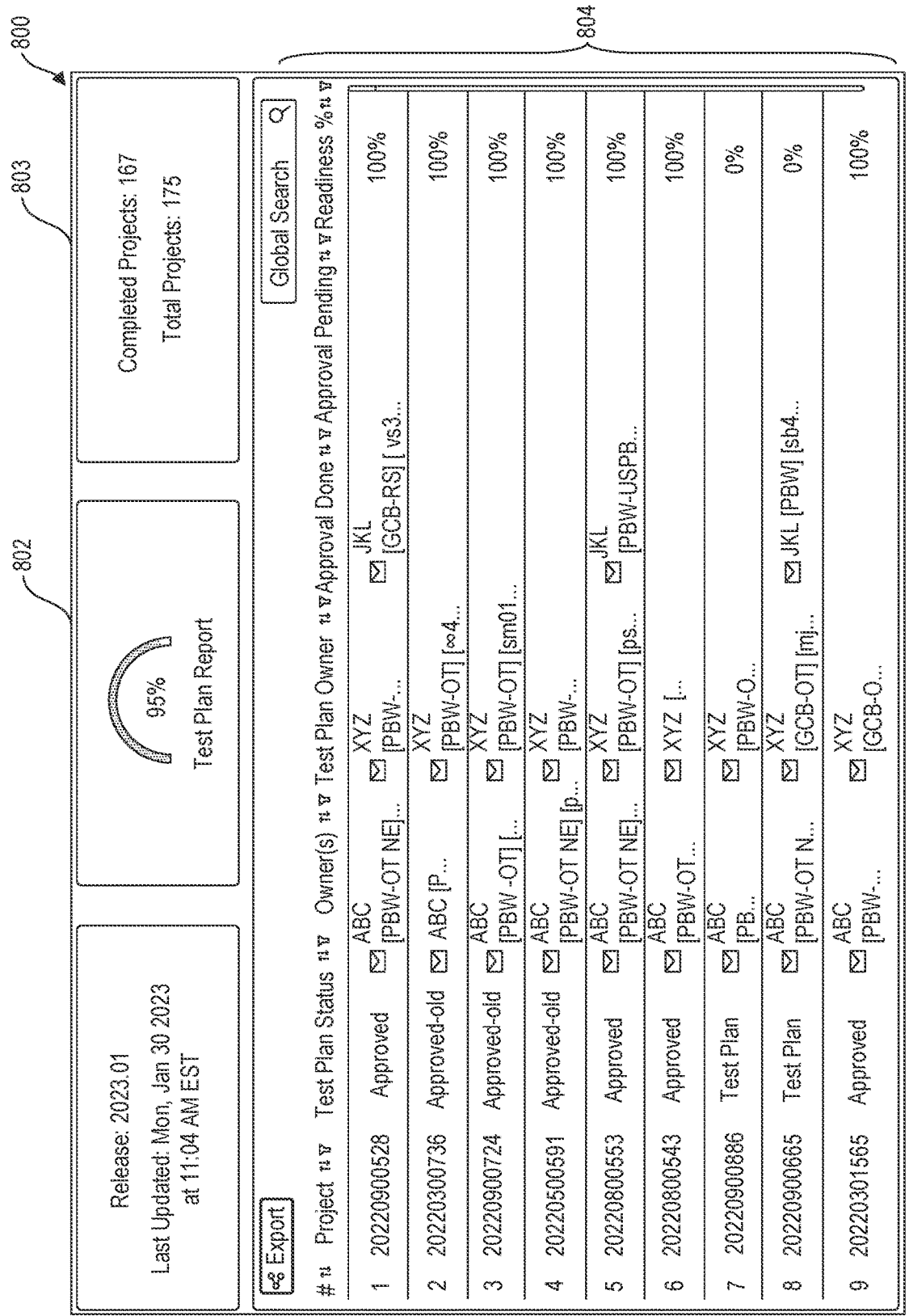
FIG. 8 is a GUI diagram illustrating example test plan analytics of the disclosed system in some implementations of the present technology.

FIG. 8 is a GUI diagram illustrating example test plan analytics of the disclosed system in some implementations of the present technology. As a general overview, the GUI diagram (800) illustrates implementations where the project-, test-, and application-level items from the generated system data stream are used to determine and/or predict test plan information. For example, determining and/or predicting the test plan information can include determining and/or generating a prediction regarding an extent (e.g., percentage) to which a test plan has been completed for a particular feature.

As shown, various items included in test plan analytics (804) from the generated system data stream can be programmatically bound to a presentation control (e.g., grid, table, text area, graphic, or another suitable control). In some implementations, these items can include data items organized by project. For example, project data can be programmatically associated with test case data to derive, by project, a test plan status, owner(s), approver(s), approval status, and/or a readiness percentage. In some implementations, project data can be prioritized or otherwise sequenced, altered, or enhanced by applying to the project data a set of parsing criteria and/or supplemental project information, such as priority information, received from a project tracking system.

According to various implementations, to optimize system performance, test plan analytics (804) can be built into (e.g., at the computational logic layer) the set of operations that generates the system data stream and/or can be performed after the system data stream is generated and before various elements of the system data stream are bound to the GUI controls. For example, when the system data stream is generated, test data and project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of completed and/or approved test plan items may change dynamically, the test exit counts can be determined dynamically as the GUI is provided to the subscriber.

FIG. 9 is a GUI diagram illustrating example implementation approval analytics of the disclosed system in some implementations of the present technology. As a general overview, the GUI diagram (900) illustrates implementations where the project-, test-, and application-level items from the generated system data stream are used to determine and/or predict implementation approval information. For example, determining and/or predicting the implementation approval information can include determining and/or generating a prediction regarding an extent (e.g., percentage) to which a tested feature has been approved for implementation in a release environment, production environment, and/or the like.

As shown, various items included in implementation approval analytics (904) from the generated system data stream can be programmatically bound to a presentation control (e.g., grid, table, text area, graphic, or another suitable control). In some implementations, these items can include data items organized by project. For example, project data can be programmatically associated with test case data to derive, by project, an implementation approval status, owner(s), approver(s), and/or a readiness percentage. In some implementations, project data can be prioritized or otherwise sequenced, altered, or enhanced by applying to the project data a set of parsing criteria and/or supplemental project information, such as priority information, received from a project tracking system.

According to various implementations, to optimize system performance, implementation approval analytics (904) can be built into (e.g., at the computational logic layer) the set of operations that generates the system data stream and/or can be performed after the system data stream is generated and before various elements of the system data stream are bound to the GUI controls. For example, when the system data stream is generated, test data, implementation approval data and project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of implementation approval items may change dynamically, the counts can be determined dynamically as the GUI is provided to the subscriber.

Figure 10A:
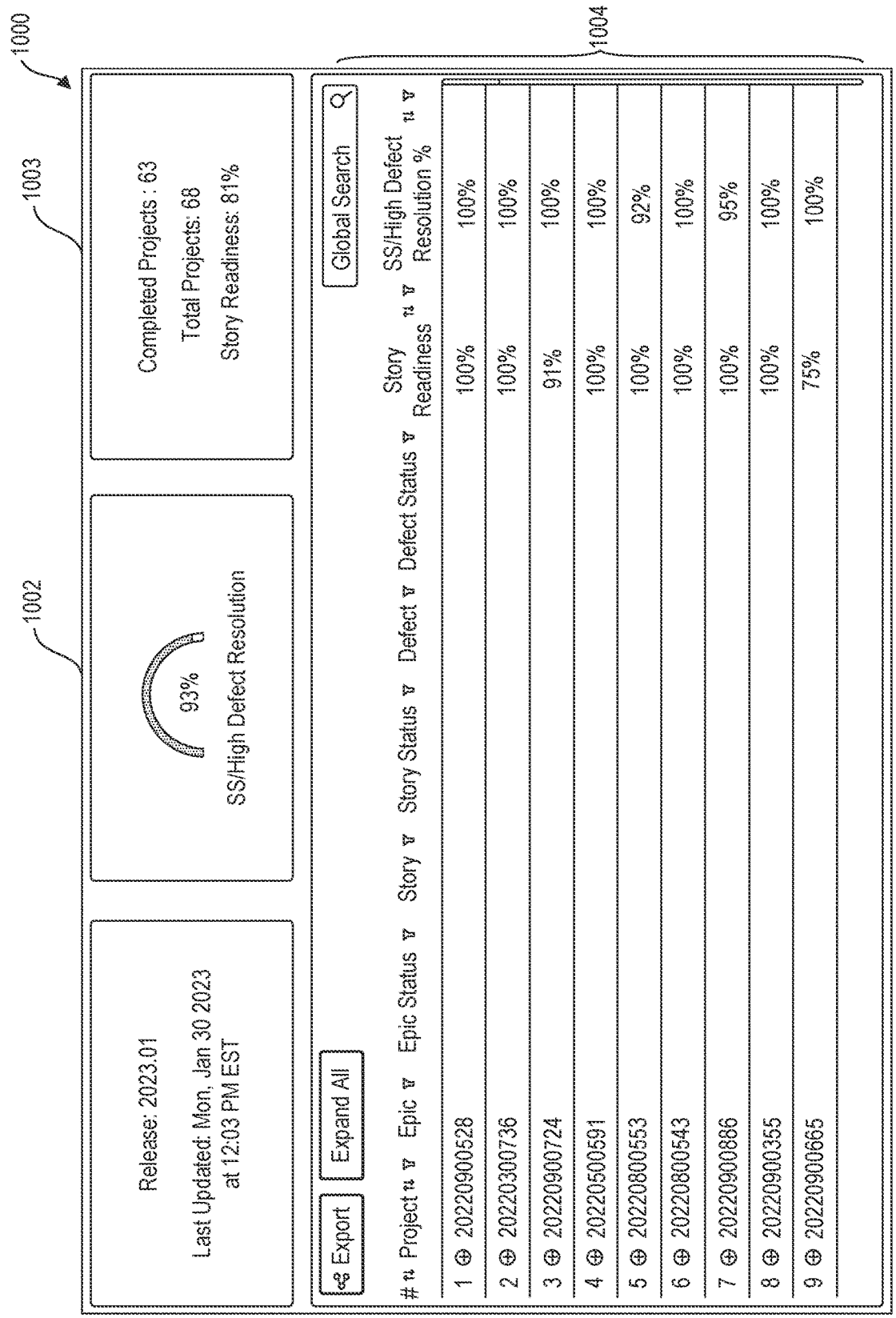
FIGS. 10A and 10B are GUI diagrams illustrating example defect resolution analytics of the disclosed system in some implementations of the present technology.
Figure 10B:
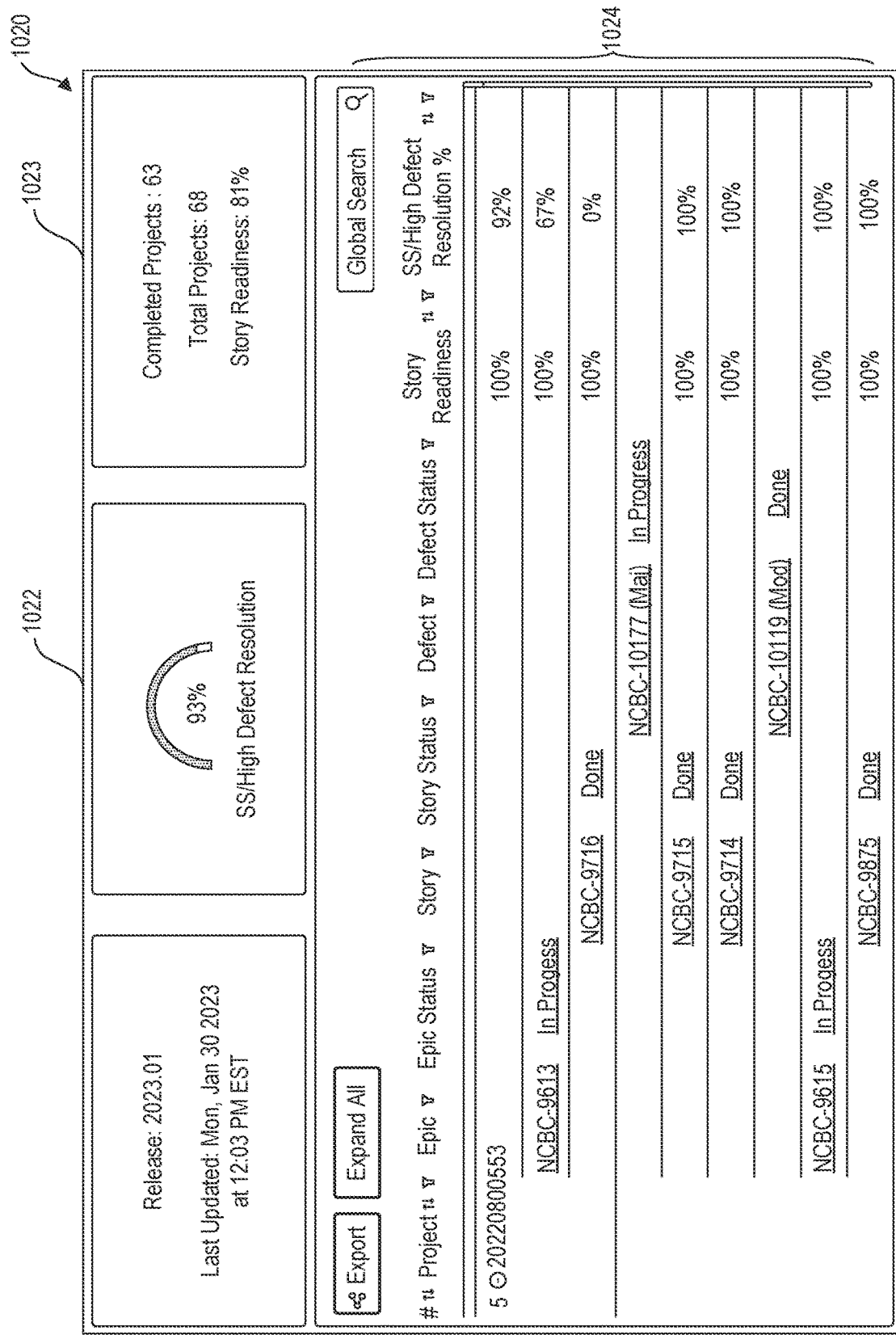

FIGS. 10A and 10B are GUI diagrams illustrating example defect analytics of the disclosed system in some implementations of the present technology. As a general overview, the GUI diagrams (1000, 1020) illustrate implementations where the project-, test-, and application-level items from the generated system data stream are used to determine and/or predict the extent to which identified system defects have been resolved. For example, determining and/or predicting the system defects can include determining and/or generating a prediction regarding an extent (e.g., percentage) to which deviations from requirements (e.g., identified based on the test data) for a particular feature have been resolved.

As shown, various items included in defect analytics (1004, 1024) from the generated system data stream can be programmatically bound to a presentation control (e.g., grid, table, text area, graphic, or another suitable control). In some implementations, these items can include data items organized by project, epic, and/or story. For example, project data can be programmatically associated with test case data to derive, by project, epics, epic statuses, stories, story statuses, defects, defect statuses, a readiness percentage and/or a defect resolution percentage. In some implementations, to address small screen limitations, the GUI can be structured to present consolidated and detailed views of the data in response to user interactions with GUI controls. In some implementations, project data can be prioritized or otherwise sequenced, altered, or enhanced by applying to the project data a set of parsing criteria and/or supplemental project information, such as priority information, received from a project tracking system.

According to various implementations, to optimize system performance, defect analytics (1004, 1024) can be built into (e.g., at the computational logic layer) the set of operations that generates the system data stream and/or can be performed after the system data stream is generated and before various elements of the system data stream are bound to the GUI controls. For example, when the system data stream is generated, test data, defect data and project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of completed and/or approved defect items may change dynamically, the counts and/or percentages can be determined dynamically as the GUI is provided to the subscriber.

Figure 11A:
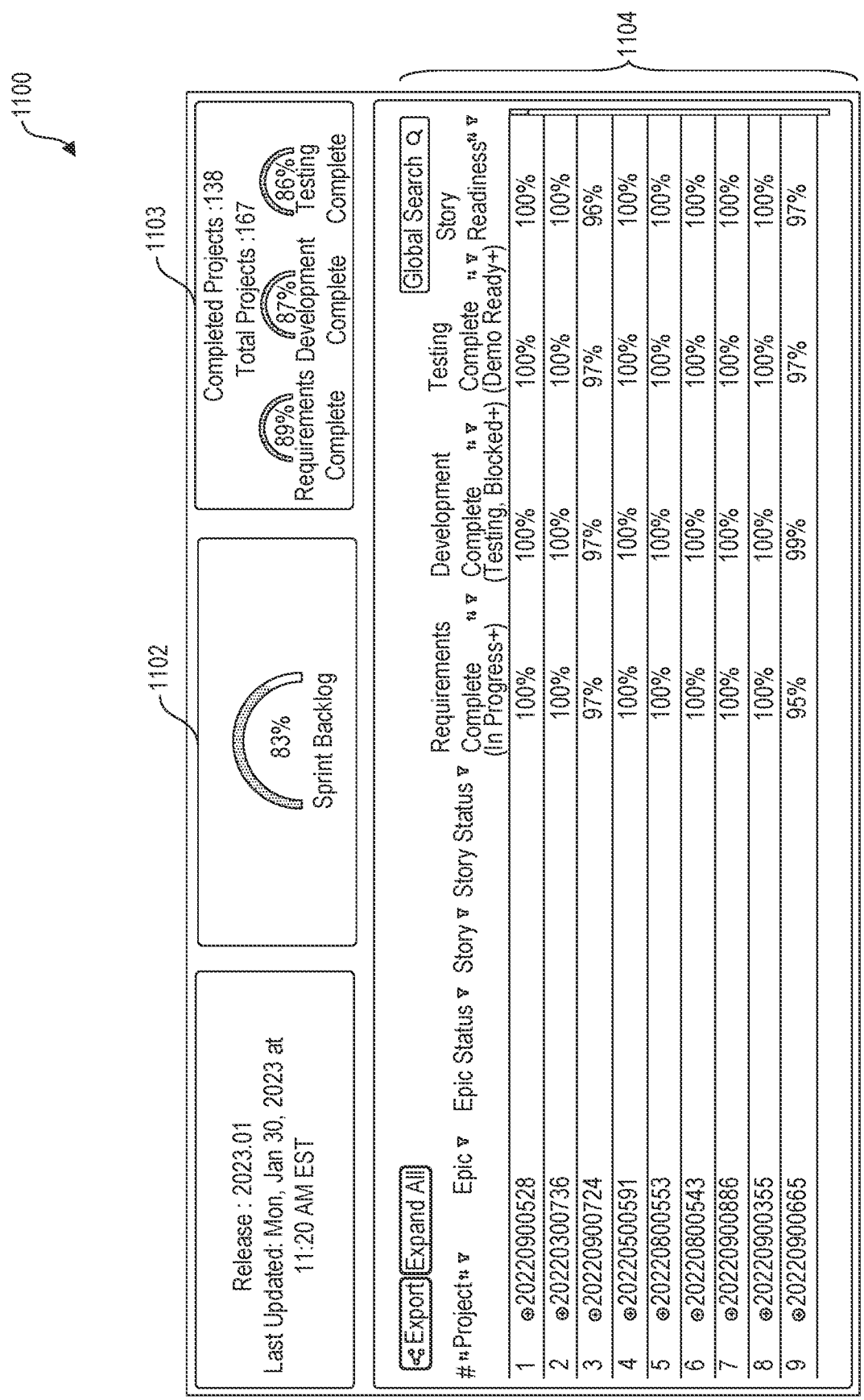
FIGS. 11A and 11B are GUI diagrams illustrating example sprint backlog analytics of the disclosed system in some implementations of the present technology.
Figure 11B:
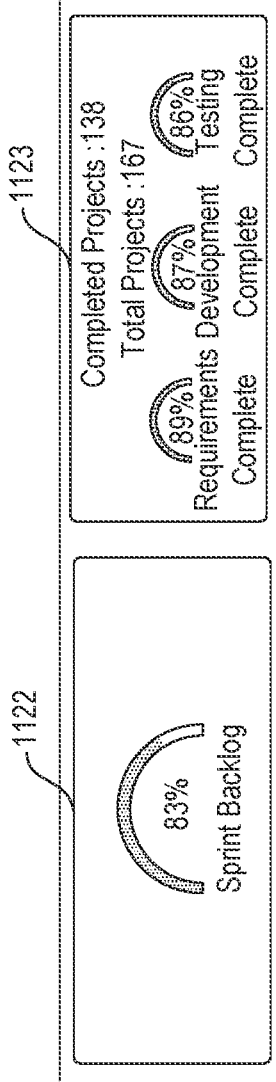

FIGS. 11A and 11B are GUI diagrams illustrating example sprint backlog analytics of the disclosed system in some implementations of the present technology. As a general overview, the GUI diagrams (1100, 1120) illustrate implementations where the project-, test-, and application-level items from the generated system data stream are used to determine and/or predict the completion level of various groups of tasks, such as requirements definition, development, and/or testing.

As shown, various items included in sprint backlog analytics (1104, 1124) from the generated system data stream can be programmatically bound to a presentation control (e.g., grid, table, text area, graphic, or another suitable control). In some implementations, these items can include data items organized by project. For example, project data can be programmatically associated with test case data to derive, by project, the related epic, epic status, story, story status, and/or the completion level of various groups of tasks, such as requirements definition, development, and/or testing. In some implementations, to address small screen limitations, the GUI can be structured to present consolidated and detailed views of the data in response to user interactions with GUI controls. In some implementations, project data can be prioritized or otherwise sequenced, altered, or enhanced by applying to the project data a set of parsing criteria and/or supplemental project information, such as priority information, received from a project tracking system.

According to various implementations, to optimize system performance, sprint backlog analytics (1104, 1124) can be built into (e.g., at the computational logic layer) the set of operations that generates the system data stream and/or can be performed after the system data stream is generated and before various elements of the system data stream are bound to the GUI controls. For example, when the system data stream is generated, test data, defect data and project data can be tagged and/or linked based on a determined common identifier, such as a project identifier and/or a user story identifier. For example, groups of activities (e.g., requirements, development, testing) can be determined and the corresponding data items accordingly labeled. For example, when the system data stream is generated, in order to increase the speed of data retrieval when the GUI is displayed, affected applications can be determined and the data stream can be tagged with the corresponding affected application information. For example, because completion levels may change dynamically, the counts and/or percentages can be determined dynamically as the GUI is provided to the subscriber.

Figure 12A:
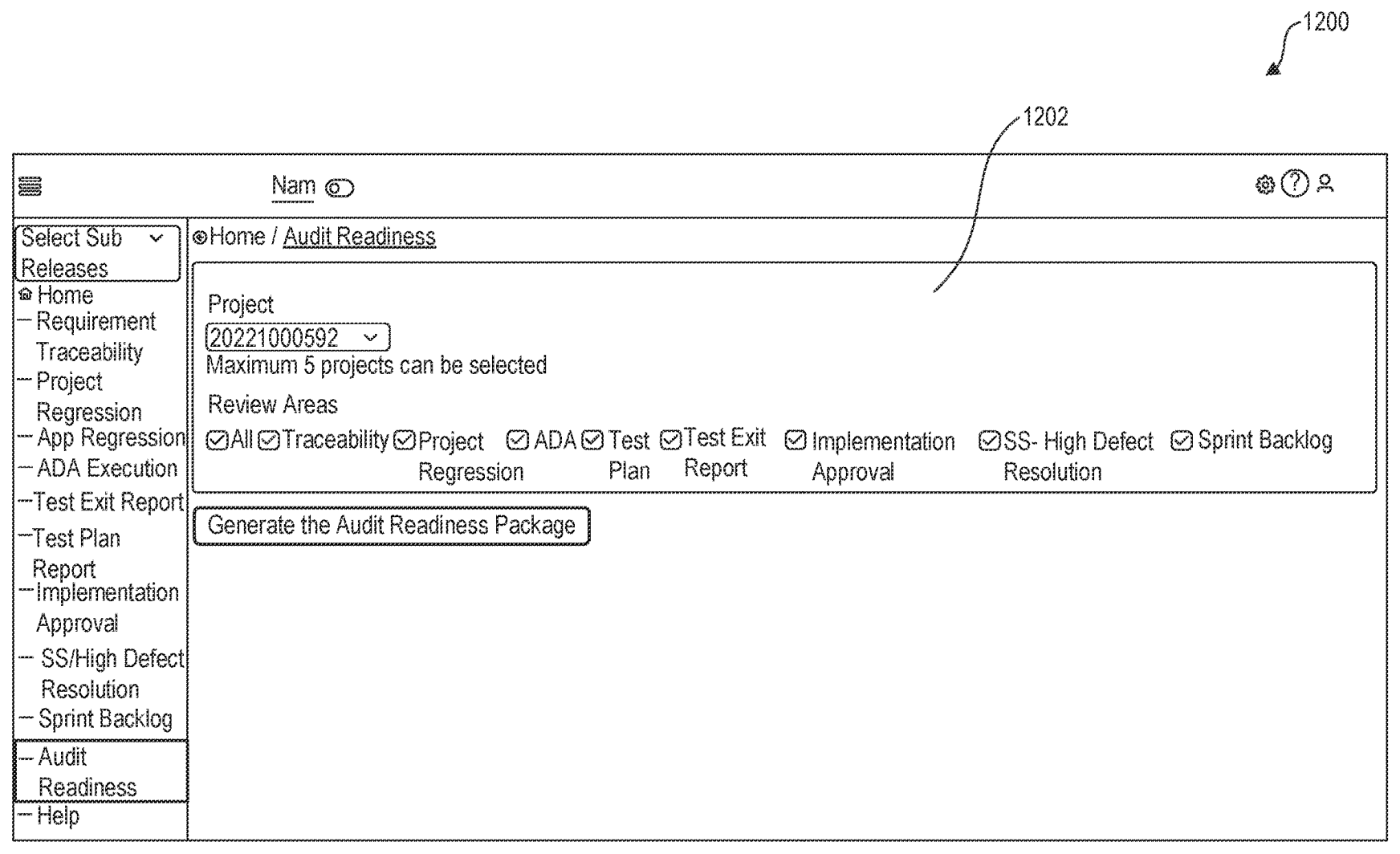

FIGS. 12A and 12B are GUI diagrams illustrating example system audit readiness analytics of the disclosed system in some implementations of the present technology. As a general overview, the GUI diagrams (1200, 1200) illustrate implementations where the project-, test-, and application-level items from the generated system data stream are used to generate end-to-end insights into the system development lifecycle data. As shown, the dimension selection controls 1202 allow a subscriber to select or unselect various system control items 1222, such as requirement traceability, project regression, system accessibility compliance, test plan readiness, test exit completion, implementation approval, defect resolution, and/or sprint backlog. Ordinarily, such single-screen insights into system control items are not available via conventional test, project tracking, application tracking, change management, and other systems. As shown, in some implementations, audit readiness analytics can be performed more than one project and/or application at the same time, and overall system control statistics for the selected project and/or application set can be determined and displayed. As shown, the system can generate a structured data file that may include multiple tabs 1224 to show detailed statistics for one or more selected system control items 1222.

Figure 13:
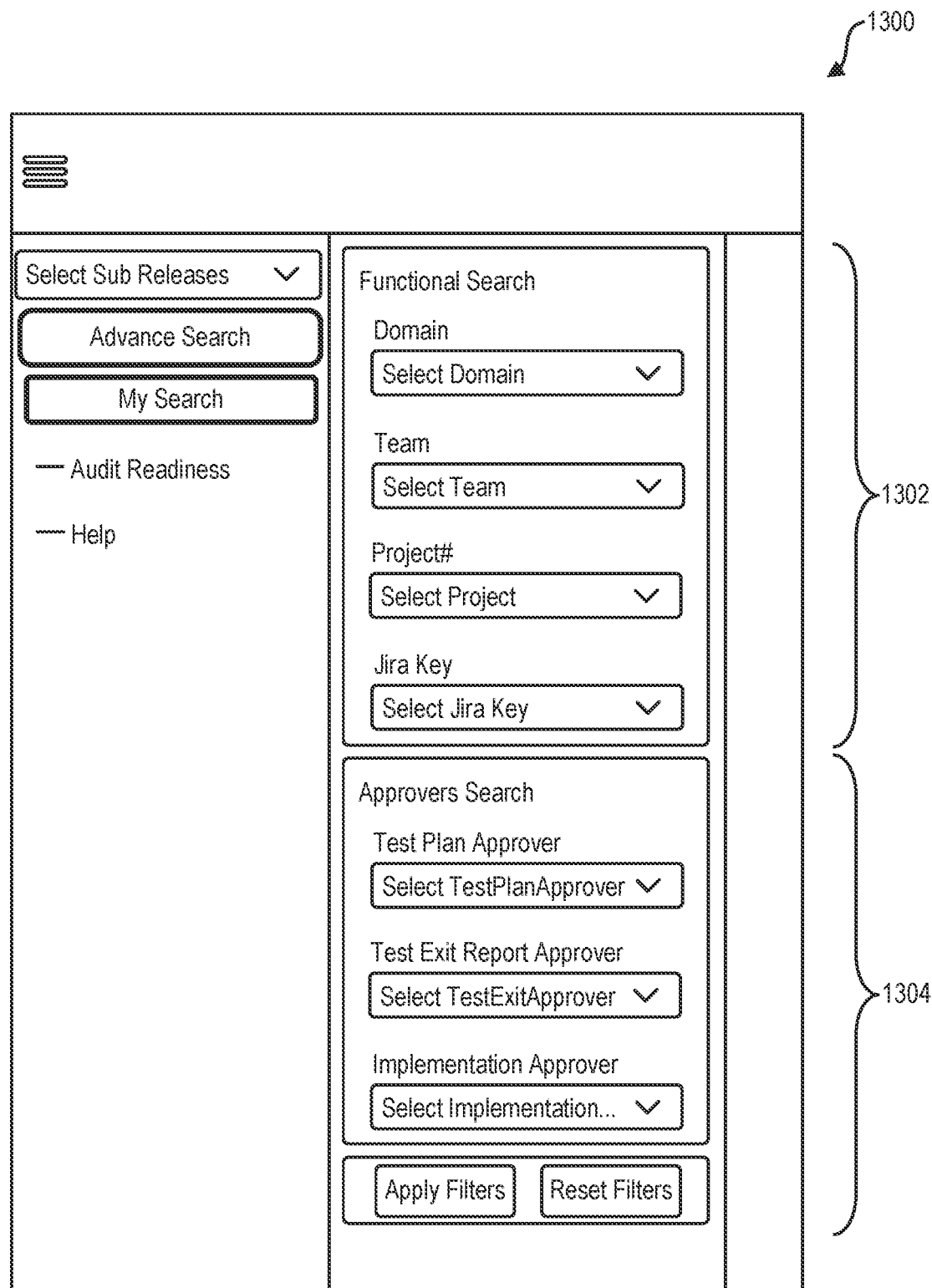
FIG. 13 is a GUI diagram illustrating example search capabilities of the disclosed system in some implementations of the present technology.

FIG. 13 is a GUI diagram 1300 illustrating example search capabilities of the disclosed system in some implementations of the present technology. As shown, users can perform global searches on items included in system data streams. As an example, users can use functional search 1302 criteria alone and/or in combination with approver search 1304 criteria. In some implementations, a plurality of data streams is searched and the data is returned in a single data set. In some implementations, to optimize computing resources for the searches, the search domain excludes historical data and includes only point-in-time (e.g., most recent) data stream data.

Figure 14:
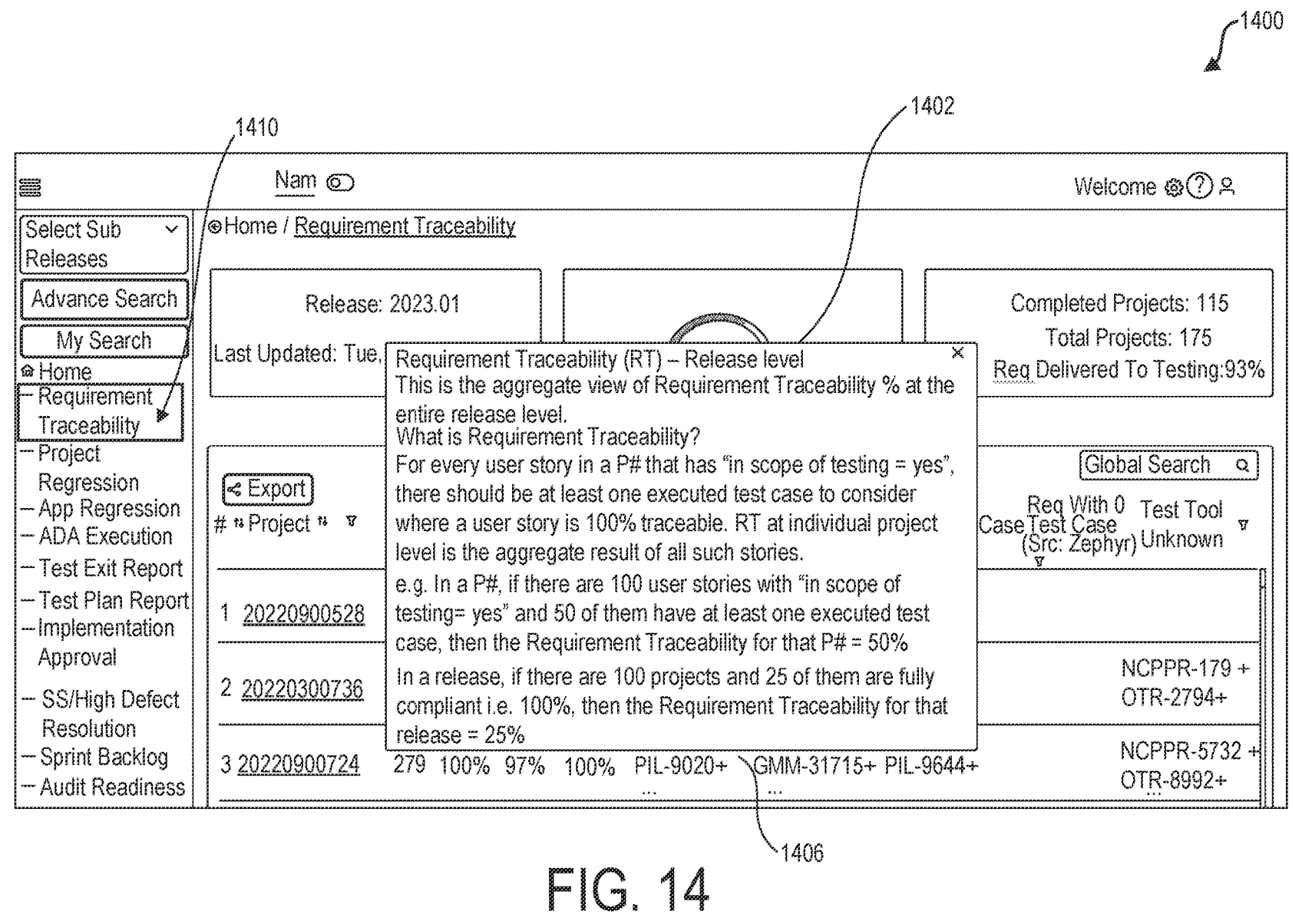

FIG. 14 is a GUI diagram 1400 illustrating example contextual help 1402 capabilities of the disclosed system in some implementations of the present technology. In some implementations, contextual help 1402 items are dynamically generated and presented via the GUI when a user interaction with a particular item 1410 (e.g., a displayed item such as a menu item) is detected. According to various implementations, contextual help 1402 items can include descriptions related to items 1406 included in data streams, formulas and/or algorithms used to generate the particular items 1406 in the data streams, and/or the like.

Machine Learning Model(s) of the Example Analytics System(s)

Figure 15:
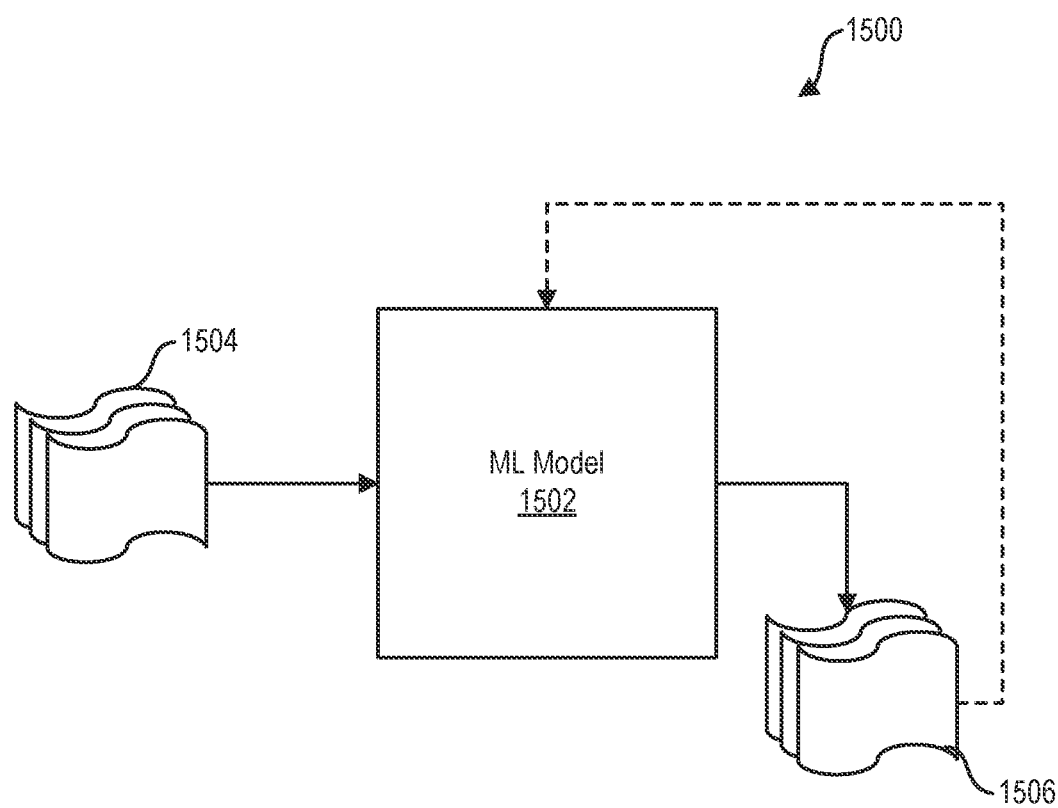
FIG. 15 is a block diagram illustrating an example machine learning model of a computing environment in which the disclosed system operates in some implementations of the present technology.

FIG. 15 is a block diagram illustrating an example machine learning model 1500 of a computing environment in which the disclosed system operates in some implementations of the present technology. According to various implementations, analytics system 110 can include one or more machine learning models. The machine learning models can be structured to perform any suitable artificial intelligence-based operations to perform requirements traceability analytics, project regression analytics, system accessibility analytics, test exit analytics, test plan analytics, approval analytics, defect analytics, sprint backlog analytics, and/or audit readiness analytics for various computing systems within an organization and/or the like. Machine learning models can include one or more convolutional neural networks (CNN), deep learning (DL) models, translational models, natural language processing (NLP) models, computer vision-based models, or any other suitable models for enabling the operations described herein.

In some implementations, the machine learning models, such as the machine learning model 1500, can include one or more neural networks. As an example, neural networks may be based on a large collection of neural units (or artificial neurons). Neural networks may loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit may have a summation function which combines the values of all its inputs together. In some embodiments, each connection (or the neural unit itself) may have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free-flowing, with connections interacting in a more chaotic and complex fashion.

As an example, machine learning models 1500 can ingest inputs 1504 and provide outputs 1506. In one use case, outputs 1506 can be fed back to a machine learning model as inputs to train machine learning model (e.g., alone or in conjunction with user indications of the accuracy of outputs, labels associated with the inputs, or with other reference feedback information). In another use case, a machine learning model 1500 can update its configurations (e.g., weights, biases, or other parameters) based on its assessment of its prediction (e.g., outputs 1506) and reference feedback information (e.g., user indication of accuracy, reference labels, or other information). In another use case, where a machine learning model 1500 is a neural network, connection weights can be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this manner, for example, the machine learning model 1500 may be trained to generate better predictions.

As an example, where the prediction models include a neural network, the neural network can include one or more input layers, hidden layers, and output layers. The input and output layers can respectively include one or more nodes, and the hidden layers may each include a plurality of nodes. When an overall neural network includes multiple portions trained for different objectives, there may or may not be input layers or output layers between the different portions. The neural network can also include different input layers to receive various input data. Also, in differing examples, data can input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

According to various implementations, machine learning models can be trained based on information stored in a local data store associated with the analytics system 110 and/or a remote data store associated with the analytics system 110.

Example Architecture(s) of the Example Analytics System(s)

Figure 16:
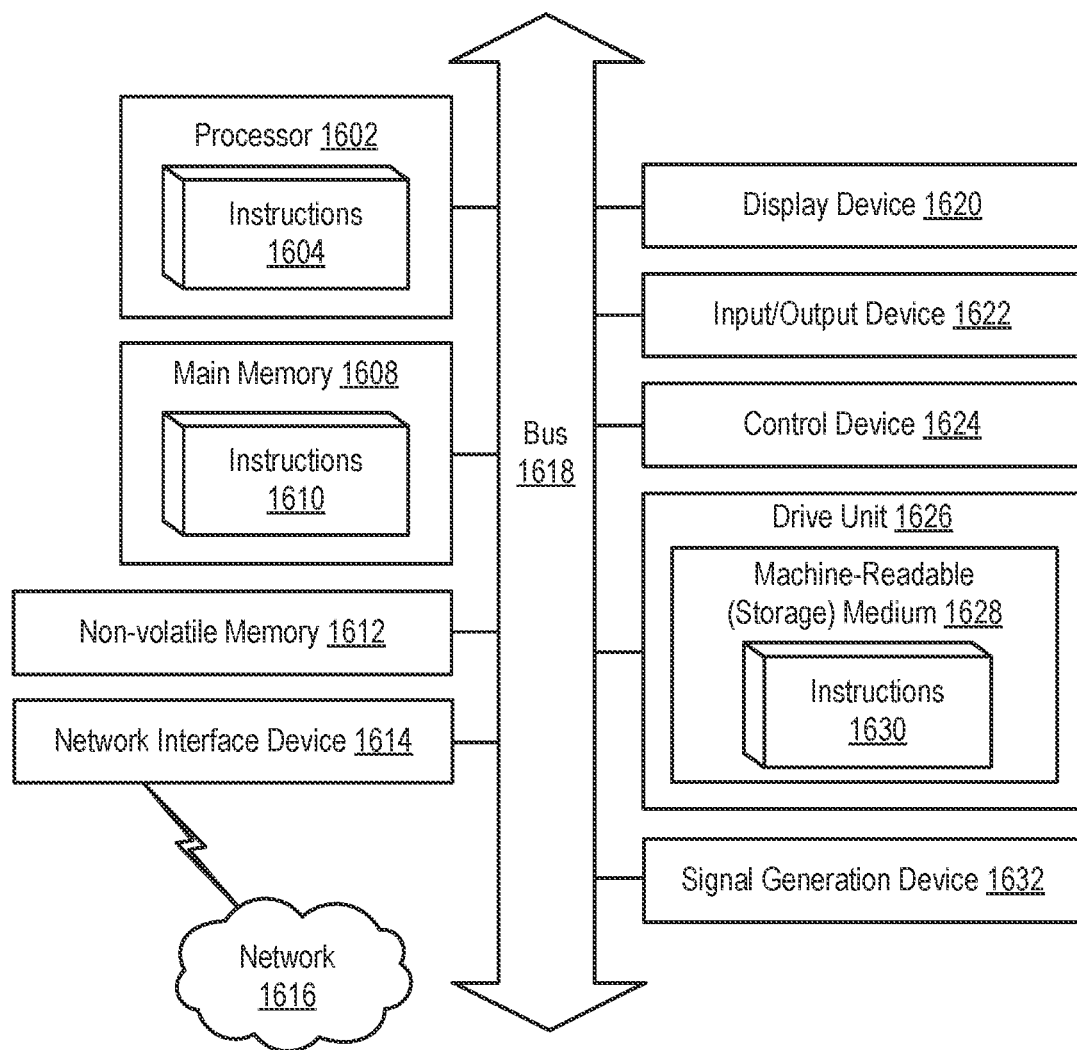
FIG. 16 is a block diagram illustrating an example of a computing environment in which the disclosed system operates in some implementations of the present technology.

FIG. 16 is a block diagram illustrating an example of a computing environment in which the disclosed system operates in some implementations of the present technology. In various implementations, these computer systems and other devices can include server computer systems, desktop computer systems, laptop computer systems, netbooks, mobile phones, personal digital assistants, televisions, cameras, automobile computers, electronic media players, etc. In various implementations, the computer systems and devices include zero or more of each of the following: a central processing unit (CPU) 1602 for executing computer programs; a computer memory 1608 for storing programs and data while they are being used, including the facility and associated data, an operating system including a kernel, and device drivers; a persistent storage device 1612, such as a hard drive or flash drive for persistently storing programs and data; computer-readable media drives 1628 that are tangible storage means that do not include a transitory, propagating signal, such as a floppy, CD-ROM, or DVD drive, for reading programs and data stored on a computer-readable medium; and a network connection 1614 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of a facility, those skilled in the art will appreciate that the facility may be implemented using devices of various types and configurations, and having various components.

Figure 17:
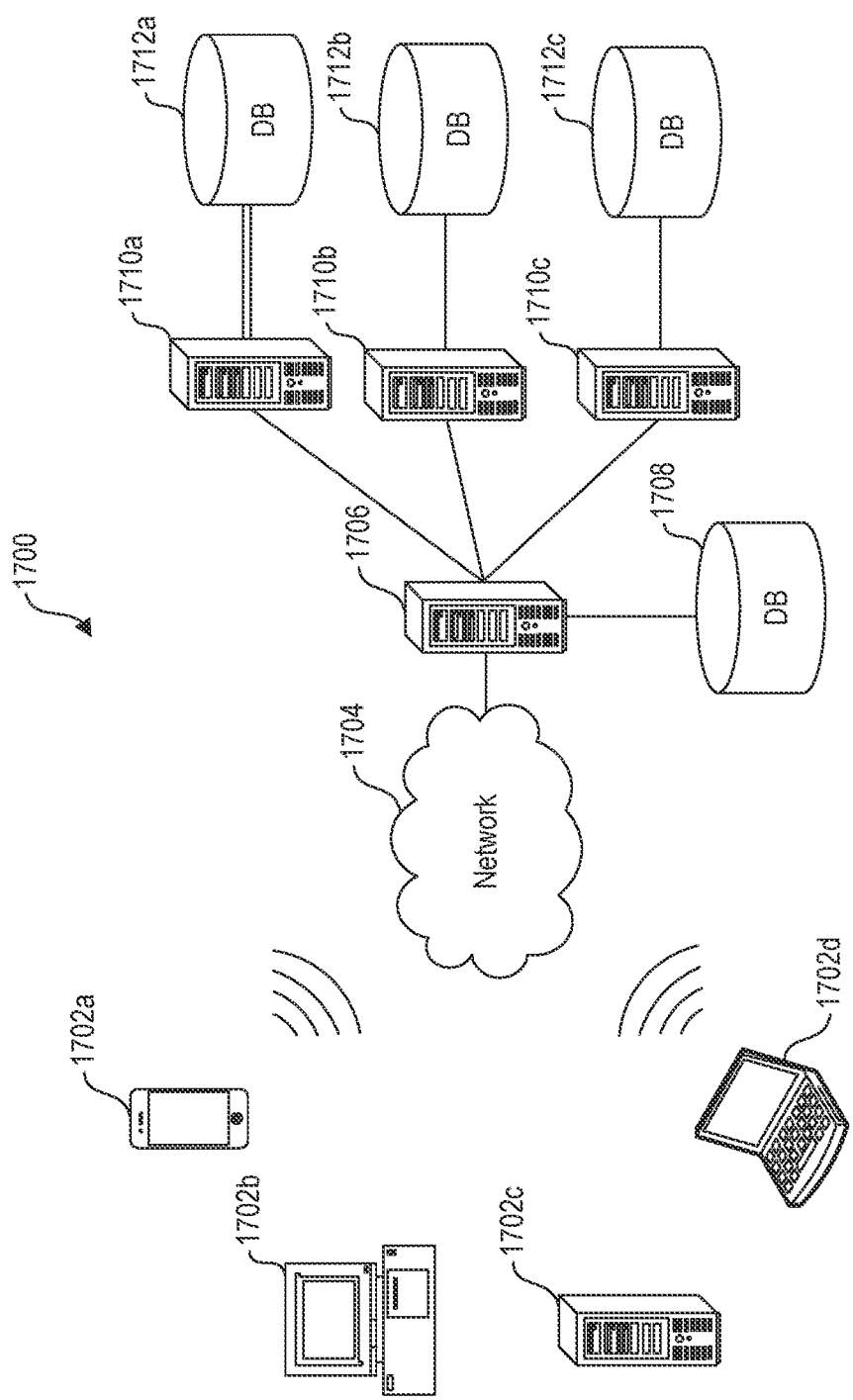
FIG. 17 is a system diagram showing some of the components typically incorporated in at least some of the computer systems and other devices on which the disclosed system operates in accordance with some implementations of the present technology.

FIG. 17 is a system diagram showing some of the components typically incorporated in at least some of the computer systems and other devices on which the disclosed system operates in accordance with some implementations of the present technology. In some implementations, environment 1700 includes one or more client computing devices 1702A-D, examples of which can host the analytics system 110. Client computing devices 1702A-D operate in a networked environment using logical connections through network 1704 to one or more remote computers, such as a server computing device.

In some implementations, server 1706 is an edge server which receives client requests and coordinates fulfillment of those requests through other servers, such as servers 1710A-C. In some implementations, server computing devices 1710A-C comprise computing systems, such as the analytics system 110. Though each server computing device 1710A-C is displayed logically as a single server, server computing devices can each be a distributed computing environment encompassing multiple computing devices located at the same or at geographically disparate physical locations. In some implementations, each server 1710A-C corresponds to a group of servers.

Client computing devices 1702A-D and server computing devices 1710A-C can each act as a server or client to other server or client devices. In some implementations, servers 1710A-C connect to a corresponding database 1712A-C. As discussed above, each server 1710A-C can correspond to a group of servers, and each of these servers can share a database or can have its own database. Databases 1712A-C warehouse (e.g., store) information such items included in various data streams. Though databases 1712A-C are displayed logically as single units, databases 1712A-C can each be a distributed computing environment encompassing multiple computing devices, can be located within their corresponding server, or can be located at the same or at geographically disparate physical locations.

Network 1704 can be a local area network (LAN) or a wide area network (WAN), but can also be other wired or wireless networks. In some implementations, network 1704 is the Internet or some other public or private network. Client computing devices 1702A-D are connected to network 1704 through a network interface, such as by wired or wireless communication. While the connections between server 1706 and servers 1710A-C are shown as separate connections, these connections can be any kind of local, wide area, wired, or wireless network, including network 1708 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. One or more non-transitory computer-readable media storing instructions, which when executed by at least one processor, perform operations comprising:
    generating a graphical user interface displayable on a client device communicatively coupled to an analytics circuit;
    generating, by the analytics circuit, a system data stream that stitches together data from two or more of computing systems, comprising:
        extracting, by the analytics circuit, from a first data stream received from a system quality assurance (QA) management system, test case data;
        parsing, by the analytics circuit, metadata from the test case data, the metadata comprising embedded markup-language item comprising a user story identifier;
        using the user story identifier to parse, by the analytics circuit from a second data stream received from a system development lifecycle (SDLC) management computing system, SDLC item data corresponding to a particular user story, the SDLC item data comprising a project identifier;
        using the project identifier to determine at least one computer application impacted by activity associated with the test case data and including the at least one computer application in a change management data set;
    determining a data stream configuration parameter; and
    based on the data stream configuration parameter, including, in the system data stream, a first particular set of test case data corresponding to the user story identifier, a second particular set of SDLC data corresponding to the determined project identifier, and a third particular set of application data corresponding to the determined project identifier; and
    binding, to two or more controls on the graphical user interface, the system data stream, wherein the two or more controls comprise a first smart dial structured to provide, via a first progress tracker, a first visual indicium related to a first item in the system data stream and a second smart dial structured to provide, via a second progress tracker, a second visual indicium related to a different, second item in the system data stream,
        wherein the first item in the system data stream and the second item in the system data stream originate from different source systems.

2. The media of claim 1, wherein determining at least one computer application impacted by activity associated with the test case data comprises identifying at least one of connected applications, impacted applications, and supported applications for a particular project corresponding to the test case data from the first data stream.

3. The media of claim 1, the operations further comprising automatically configuring the first progress tracker based on one or more items included in the system data stream.

4. The media of claim 3,
    wherein the first smart dial and the second smart dial are grouped according to an item extracted from the system data stream.

5. The media of claim 3, the operations further comprising:
    generating, based on the system data stream, requirements traceability indicia; and
    configuring the first progress tracker based on the requirements traceability indicia.

6. The media of claim 3, the operations further comprising:
    generating, based on the system data stream, system accessibility compliance indicia; and
    configuring the first progress tracker based on the system accessibility compliance indicia.

7. The media of claim 3, the operations further comprising:
    generating, based on the system data stream, project regression indicia; and
    configuring the first progress tracker based on the project regression indicia.

8. The media of claim 3, the operations further comprising:
    generating, based on the system data stream, defect indicia; and
    configuring the first progress tracker based on the defect indicia.

9. The media of claim 3, the operations further comprising:
    generating, based on the system data stream, sprint backlog indicia; and
    configuring the first progress tracker based on the sprint backlog indicia.

10. The media of claim 1, the operations further comprising:
    based on the system data stream, determining a unit completion percentage set, the unit completion percentage set comprising at least one completion percentage value for requirements traceability, system accessibility compliance, project regression, test plan, defect status, and sprint backlog status;

based on the at least one completion percentage value, determining an entity completion percentage value;

evaluating the entity completion percentage value against a threshold; and based on the evaluation of the entity completion percentage value, generating a customized electronic notification.

11. The media of claim 1, the operations further comprising:

retrieving, from a data storage medium communicatively coupled to the analytics circuit, an email message template;

extracting, from the system data stream, at least one item; and causing a communications engine communicatively coupled to the analytics engine circuit to:

determine a recipient based on the at least one item;

generate, based on the email message template and the at least one item, an electronic notification for an entity; and transmit the electronic notification to the determined recipient.

12. The media of claim 1, the operations further comprising:

extracting, from the system data stream, at least one item;

determining, based on the at least one item, a destination network storage location; and causing a communications engine communicatively coupled to the analytics circuit to:

generate an electronic file comprising the at least one extracted item; and transmit the at least one electronic file to the network storage location.

13. A method comprising:

generating, by an analytics circuit communicatively coupled to a client device having a displayable user interface, a system data stream that stitches together data from two or more of computing systems, comprising:

extracting, by the analytics circuit, from a first data stream received from a system quality assurance (QA) management system, test case data;

parsing, by the analytics circuit, metadata from the test case data, the metadata comprising embedded markup-language item comprising a user story identifier;

using the user story identifier to parse, by the analytics circuit from a second data stream received from a system development lifecycle (SDLC) management computing system, SDLC item data corresponding to a particular user story, the SDLC item data comprising a project identifier;

using the project identifier to determine at least one computer application impacted by activity associated with the test case data and including the at least one computer application in a change management data set;

determining a data stream configuration parameter; and based on the data stream configuration parameter, including, in the system data stream, a first particular set of test case data corresponding to the user story identifier, a second particular set of SDLC data corresponding to the determined project identifier, and a third particular set of application data corresponding to the determined project identifier; and binding, to two or more controls on a graphical user interface displayable on a client device communicatively coupled to an analytics circuit, the system data stream, wherein the two or more controls comprise a first smart dial structured to provide, via a first progress tracker, a first indicium related to a first item in the system data stream and a second smart dial structured to provide, via a second progress tracker, a second visual indicium related to a different, second item in the system data stream, wherein the first item in the system data stream and the second item in the system data stream originate from different source systems.

14. The method of claim 13, further comprising automatically configuring the first progress tracker based on one or more items included in the system data stream, the one or more items comprising requirements traceability indicia, system accessibility compliance indicia, project regression indicia, defect indicia, or sprint backlog indicia.

15. The method of claim 14, wherein the first smart dial and the second smart dial are grouped according to an item extracted from the system data stream, and wherein the item is at least one of an application identifier, a project identifier, and a release identifier.

16. The method of claim 13, further comprising generating an electronic transmission to a downstream entity determined based on an item in the system data stream, the downstream entity being one of an email recipient and a network storage location.

17. A computing system comprising at least one processor and computer-readable medium having instructions stored thereon that, when executed by the at least one processor, cause the at least one processor to perform operations comprising:

generate, by an analytics circuit communicatively coupled to a client device having a displayable user interface, a system data stream that stitches together data from two or more of computing systems, comprising:

extract, by the analytics circuit, from a first data stream received from a system quality assurance (QA) management system, test case data;

parse, by the analytics circuit, metadata from the test case data, the metadata comprising embedded markup-language item comprising a user story identifier;

use the user story identifier to parse by the analytics circuit from a second data stream received from a system development lifecycle (SDLC) management computing system, SDLC item data corresponding to a particular user story, the SDLC item data comprising a project identifier;

use the project identifier to determine at least one computer application impacted by activity associated with the test case data and including the at least one computer application in a change management data set;

determine a data stream configuration parameter; and based on the data stream configuration parameter, include, in the system data stream, a first particular set of test case data corresponding to the user story identifier, a second particular set of SDLC data corresponding to the determined project identifier, and a third particular set of application data corresponding to the determined project identifier; and bind, two or more controls on a graphical user interface, the system data stream, wherein the two or more controls comprise a first smart dial structured to provide, via a first progress tracker, a first indicium related to a first item in the system data stream and a second smart dial structured to provide, via a second progress tracker, a second visual indicium related to a different, second item in the system data stream, wherein the first item in the system data stream and the second item in the system data stream originate from different source systems.

18. The system of claim 17, the operations further comprising automatically configure the first progress tracker based on one or more items included in the system data stream, the one or more items comprising requirements traceability indicia, system accessibility compliance indicia, project regression indicia, defect indicia, or sprint backlog indicia.

19. The system of claim 18, wherein the first smart dial and the second smart dial are grouped according to an item extracted from the system data stream, and wherein the item is at least one of an application identifier, a project identifier, and a release identifier.

20. The system of claim 17, the operations further comprising generate an electronic transmission to a downstream entity determined based on an item in the system data stream, the downstream entity being one of an email recipient and a network storage location.

* * * * *

UNITED STATES PATENT AND TRADEMARK OFFICE
CERTIFICATE OF CORRECTION

| | | |
|---|---|---|
| PATENT NO. | : 11,797,936 B1 | Page 1 of 1 |
| APPLICATION NO. | : 18/124870 | |
| DATED | : October 24, 2023 | |
| INVENTOR(S) | : Vitthal Ramling Betgar et al. | |

It is certified that error appears in the above-identified patent and that said Letters Patent is hereby corrected as shown below:

In the Specification

In Column 14, Line 47, delete "(1200, 1200)" and insert --(1200, 1220)-- therefor.

In the Claims

In Column 21, Line 16, Claim 11, after "analytics", delete "engine".
In Column 22, Line 4, Claim 13, before "indicium", insert --visual--.
In Column 22, Line 64, Claim 17, after "bind,", insert --to--.
In Column 22, Line 67, Claim 17, before "indicium", insert --visual--.

Signed and Sealed this
Fifth Day of March, 2024

*Katherine Kelly Vidal*

Katherine Kelly Vidal
*Director of the United States Patent and Trademark Office*